United States Patent
Ohta

(10) Patent No.: US 9,403,292 B2
(45) Date of Patent: Aug. 2, 2016

(54) MOLD FOR FOAM MOLDING AND METHOD FOR PRODUCING FOAM-MOLDED MEMBER

(75) Inventor: Masato Ohta, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 781 days.

(21) Appl. No.: 13/574,130

(22) PCT Filed: Jan. 27, 2011

(86) PCT No.: PCT/JP2011/051619
§ 371 (c)(1),
(2), (4) Date: Jul. 19, 2012

(87) PCT Pub. No.: WO2011/093386
PCT Pub. Date: Aug. 4, 2011

(65) Prior Publication Data
US 2012/0286445 A1 Nov. 15, 2012

(30) Foreign Application Priority Data
Jan. 28, 2010 (JP) ................................. 2010-017031

(51) Int. Cl.
*B29C 44/12* (2006.01)
*B29C 44/06* (2006.01)
(Continued)

(52) U.S. Cl.
CPC ............. *B29C 33/16* (2013.01); *B29C 44/1233* (2013.01); *B29C 44/351* (2013.01);
(Continued)

(58) Field of Classification Search
CPC .... B29C 33/14; B29C 33/16; B29C 44/1228; B29C 44/1233; B29C 44/351; B29C 44/58; B29K 2105/06; B29K 2105/0809; B29L 2031/58
USPC ................... 425/3, 4 R, 111, 121, 123, 817 R
See application file for complete search history.

(56) References Cited

U.S. PATENT DOCUMENTS 4,420,447 A * 12/1983 Nakashima ............. B29C 33/12
249/172
4,792,111 A * 12/1988 Taguchi .......................... 249/83
(Continued)

FOREIGN PATENT DOCUMENTS

EP 0282146 A2 * 9/1988 ............. B29C 33/14
JP 05-004237 A 1/1993
(Continued)

OTHER PUBLICATIONS

International Search Report for PCT/JP2011/051619 dated Apr. 12, 2011.

*Primary Examiner* — Seyed Masoud Malekzadeh
(74) *Attorney, Agent, or Firm* — Sughrue Mion, PLLC

(57) ABSTRACT

Disclosed is a mold for foam molding capable of making the operation to attach a reinforcing member to an inner surface of a mold easier, capable of sufficiently preventing entry of foam synthetic resin between the reinforcing member and the inner surface of the mold at the time of foam-molding, and capable of preventing the reinforcing member from becoming wrinkled; and also provided is a method for producing a foam-molded member which has a reinforcing member using this mold for foam molding. A mold 20 for foam molding is used to foam-mold a seat pad 1 which is provided with a seat pad main body 2 and a reinforcing member 10 disposed on the back side of the seat pad main body 2. At the time of foam-molding, the reinforcing member 10 is disposed inside the mold 20 and an end edge of the reinforcing member 10 is secured to the inner surface of the mold 20 by a securing means. A tension application means is provided which applies tension to the end edge of the reinforcing member 10 in a direction to separate from the securing means.

9 Claims, 16 Drawing Sheets

(51) Int. Cl.
  *B29C 33/16* (2006.01)
  *B29C 44/34* (2006.01)
  *B29C 44/58* (2006.01)
  *B29C 33/14* (2006.01)
  *B29K 105/08* (2006.01)
  *B29L 31/58* (2006.01)

(52) U.S. Cl.
  CPC .............. *B29C 44/58* (2013.01); *B29C 33/14* (2013.01); *B29C 44/1228* (2013.01); *B29K 2105/0809* (2013.01); *B29K 2623/06* (2013.01); *B29K 2623/12* (2013.01); *B29L 2031/58* (2013.01)

(56) References Cited

U.S. PATENT DOCUMENTS

| | | | | | |
|---|---|---|---|---|---|
| 4,973,234 | A | * | 11/1990 | Swenson | ........................... 425/3 |
| 5,096,403 | A | * | 3/1992 | Yanagishita | ........ B29C 33/0033 249/175 |
| 5,143,667 | A | * | 9/1992 | Matsuura | ................. A47C 7/18 264/46.4 |
| 5,500,169 | A | * | 3/1996 | Kondo | .................... B29C 33/14 264/46.5 |
| 5,618,477 | A | * | 4/1997 | Suzuki | ................ B29C 44/1238 264/276 |
| 5,895,613 | A | * | 4/1999 | Nakai | ................... B29C 44/351 264/276 |
| 7,153,113 | B2 | * | 12/2006 | Graham et al. | ..................... 425/3 |
| 8,021,135 | B2 | * | 9/2011 | Anbarasu et al. | ................. 425/3 |

FOREIGN PATENT DOCUMENTS

| | | | |
|---|---|---|---|
| JP | 08-197648 | A | 8/1996 |
| JP | 2001-252930 | A | 9/2001 |
| JP | 2005-237491 | A | 9/2005 |
| JP | 2008-183129 | A | 8/2008 |
| JP | 2010-240984 | A | 10/2010 |

* cited by examiner

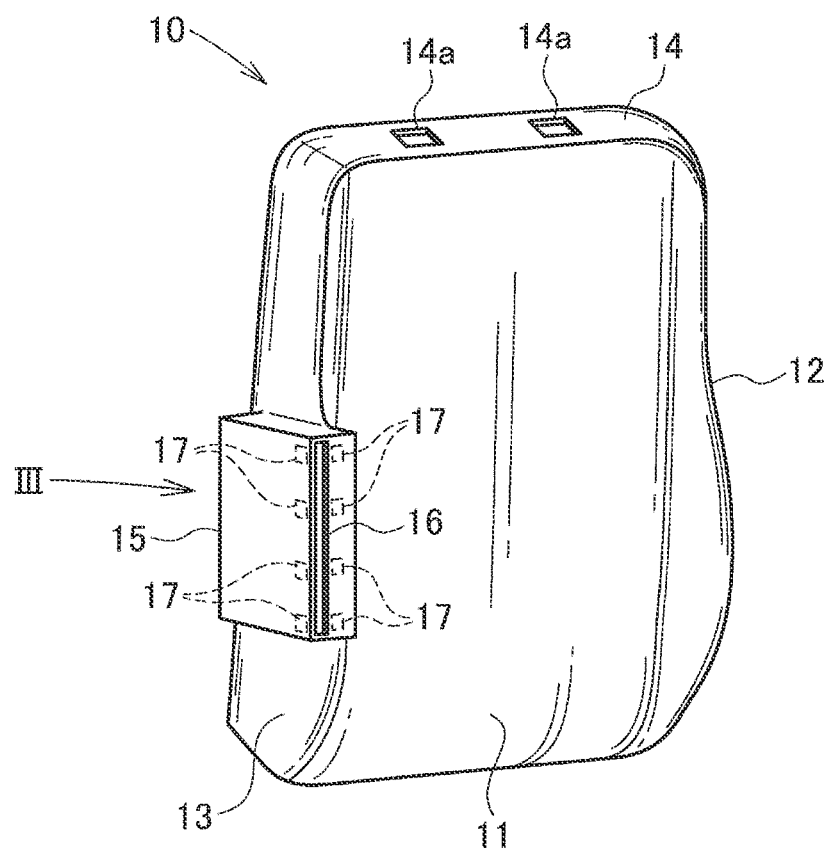

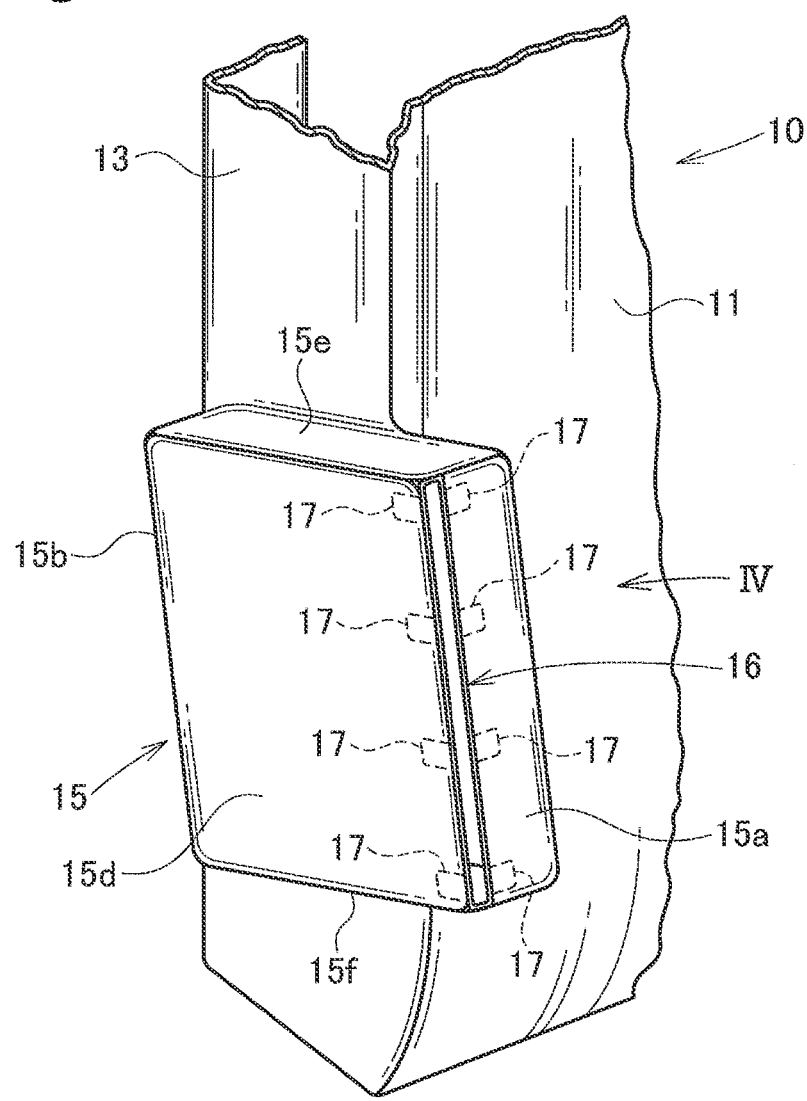

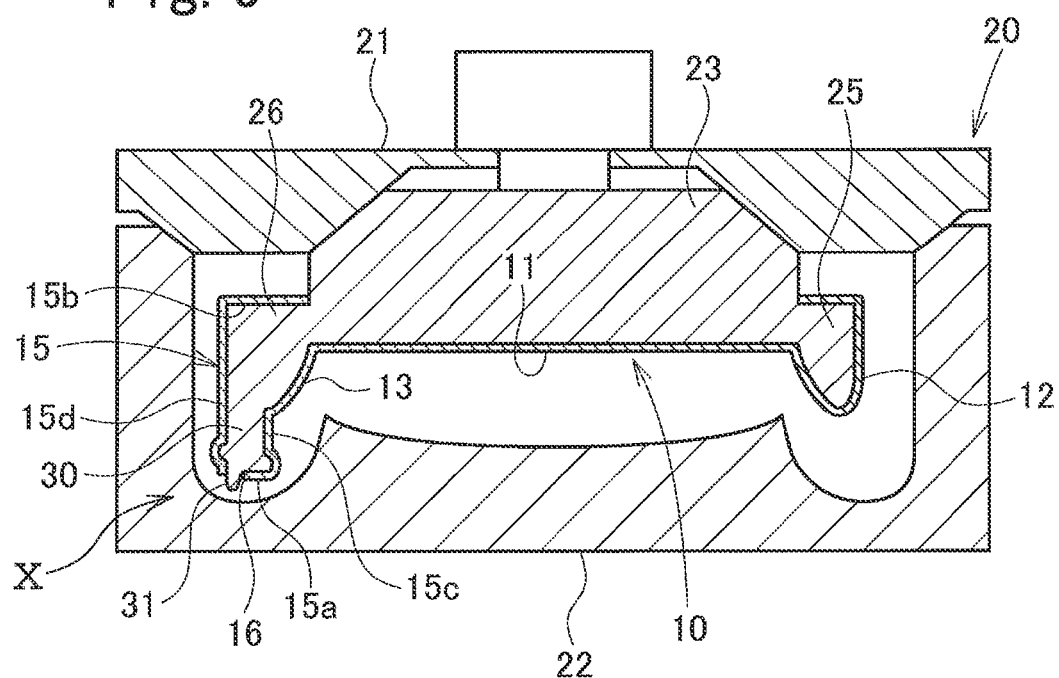

MOLD FOR FOAM MOLDING AND METHOD FOR PRODUCING FOAM-MOLDED MEMBER

CROSS REFERENCE TO RELATED APPLICATION

This application is a National Stage of International Application No. PCT/JP2011/051619, filed on Jan. 27, 2011, which claims priority from Japanese Patent Application No. 2010-017031, filed on Jan. 28, 2010, the contents of all of which are incorporated herein by reference in their entirety.

TECHNICAL FIELD

The present invention relates to a mold for foam-molding a foam-molded member which is provided with a foam-molded body and a sheet-shaped reinforcing member disposed along at least a part of a surface of the foam-molded body. More particularly, the present invention relates to a mold for foam molding which includes a reinforcing member disposed therein. An edge of the reinforcing member is secured at least partially to an inner surface of the mold with a securing means. The present invention also relates to a method for producing a foam-molded member which is provided with a reinforcing member using this mold for foam molding.

BACKGROUND ART

A vehicle seat or a seat of a sofa and the like used indoors is typically constituted by a seat pad and a surface material: the seat pad is made of foam synthetic resin, such as flexible polyurethane foam or semirigid polyurethane foam; the surface material is attached to a front surface of the seat pad.

In some cases, in order to prevent generation of unusual noise or damage to the seat pad when the seat pad is in contact with a seat frame, a reinforcing member made of nonwoven fabric and the like is provided on the back surface of the seat pad (i.e., a surface opposite to a person seated on the seat) (Japanese Patent Publication 2005-237491 A). For the molding of this seat pad with a reinforcing member using a mold, a foam synthetic resin material is made to foam in the mold to which the reinforcing member is attached before molding. In this manner, a seat pad with a reinforcing member integrated in the back side thereof is molded.

In this case, the reinforcing member is fixed to the inner surface of the mold by the following methods. For example, a magnet is provided in the mold and a magnetic body which is attracted by this magnet is provided in the reinforcing member: the reinforcing member is fixed to the inner surface of the mold by causing this magnetic body to be attracted by the magnet. Alternatively, the mold is made of a magnetic metal material which is capable of being attracted by the magnet and a magnet is attached to the reinforcing member: the reinforcing member is fixed to the inner surface of the mold by causing this magnet to be attracted by the inner surface of the mold (Japanese Patent Publication 2001-252930 A).

CITATION LIST

Patent Literature

PTL 1: Japanese Patent Publication 2005-237491 A
PTL 2: Japanese Patent Publication 2001-252930 A

SUMMARY OF INVENTION

Technical Problem

When a reinforcing member is fixed to the inside of a mold using securing means, such as a magnet, these securing means are disposed at important points at an end edge of the reinforcing member, and the end edge of the reinforcing member is secured to an inner surface of the mold. In this case, since a portion of the end edge of the reinforcing member between adjoining securing means is not secured to the inner surface of the mold, if the securing means are displaced even slightly from predetermined positions, there is a possibility that the portion is raised from the mold. In this case, there is a possibility that foam synthetic resin may ingress between the reinforcing member and the inner surface of the mold at the time of foam-molding of the seat pad, or the reinforcing member may be wrinkled, whereby precision of an outer shape may be impaired. In order to prevent this, it is necessary to provide many securing means at shorter intervals in an end edge of the reinforcing member or, when the reinforcing member is fixed to the inner surface of the mold, an operator needs to dispose each securing means precisely at a predetermined position inside the mold and secure the end edge of the reinforcing member to the inner surface of the mold. Therefore, the operation to attach the reinforcing member to the inner surface of the mold is complicated.

An object of the present invention is to provide a mold for foam molding capable of making the operation to attach a reinforcing member to the inside of a mold easier, capable of sufficiently preventing entry of foam synthetic resin between the reinforcing member and the inner surface of the mold at the time of foam-molding, and capable of preventing the reinforcing member from becoming wrinkled. Another object of the present invention is to provide a method for producing a foam-molded member which has a reinforcing member using this mold for foam molding.

Solution to Problem

A mold for foam molding of a first aspect is a mold for foam molding for foam-molding a foam-molded member which is provided with a foam-molded body and a sheet-shaped reinforcing member disposed along at least a part of a surface of the foam-molded body, wherein, in the mold in which the reinforcing member is disposed therein and in which an end edge of the reinforcing member is at least partially secured to the inner surface of the mold by a securing means, in a state in which the end edge of the reinforcing member is secured inside the mold, a tension application means for applying tension to the end edge of the reinforcing member in a direction separating from the securing means is provided.

A mold for foam molding of a second aspect is characterized by that, in the first aspect, plural securing means are provided at intervals along a direction in which the end edge of the reinforcing member extends.

A mold for foam molding of a third aspect is characterized by that, in the first or second aspect, the end edge of the reinforcing member is disposed with at least a part of the end edge thereof facing downward on the inner surface of the mold.

A mold for foam molding of a fourth aspect is characterized by that, in any of the first to third aspects, the securing means includes a magnet provided in one of the reinforcing member and the inner surface of the mold, and a magnetic body provided in the other, the magnetic body being capable of being attracted by the magnet.

A mold for foam molding of a fifth aspect is characterized by that, in any of the first to fourth aspects, the tension application means is constituted by a projecting portion which projects from the inner surface of the mold so that a portion of the reinforcing member further distanced from the end edge of the reinforcing member than the securing means is separated from the inner surface of the mold.

A mold for foam molding of a sixth aspect is characterized by that, in the fifth aspect, a projection height T of the projecting portion from the inner surface of the mold is 3 to 15 mm.

A mold for foam molding of a seventh aspect is characterized by that, in the fifth or sixth aspect, a distance $D_1$ between the projecting portion and the securing means is 50 mm or less.

A mold for foam molding of an eighth aspect is characterized by that, in any of the fifth to seventh aspects, an outer surface of the projecting portion on the side of a tip in a projecting direction is shaped to reduce a width W thereof along a direction to approach and separate from the securing means toward the tip side.

A mold for foam molding of the ninth aspect further includes, in any of the fifth to eighth aspects, a securing means for securing a part of the reinforcing member which is further distanced from the end edge of the reinforcing member than the projecting portion at least partially to the inner surface of the mold is provided.

A method of a tenth aspect for producing a foam-molded member which is provided with a foam-molded body and a sheet-shaped reinforcing member disposed along at least a part of a surface of the foam-molded body using the mold for foam molding of any of the first to ninth aspects, the method is characterized by including: a reinforcing member disposing process to dispose the reinforcing member inside the mold and to secure an end edge of the reinforcing member to the inner surface of the mold by the securing means; and a foam-molding process to foam-mold the foam-molded body inside the mold, and is characterized by that, in a state in which the end edge of the reinforcing member is secured to the inner surface of the mold, the tension is applied to the end edge of the reinforcing member in a direction to separate from the securing means by the tension application means.

A method for producing a foam-molded member of an eleventh aspect is characterized by that, in the tenth aspect, at least the end edge of the reinforcing member is made of nonwoven fabric.

A method for producing a foam-molded member of a twelfth aspect is characterized by that, in the tenth or eleventh aspect, the foam-molded member is a seat pad.

Advantageous Effects of Invention

According to the first aspect, a tension application means is provided which applies tension to an end edge of a reinforcing member in a direction to separate from a securing means in a state in which a reinforcing member for a foam-molded body is disposed on an inner surface of a mold and an end edge of the reinforcing member is secured to the inner surface of the mold by a securing means. In a method for producing a foam-molded member of the tenth aspect to produce a foam-molded member provided with a reinforcing member using a mold for foam molding of the present invention, first, the reinforcing member is disposed on the inner surface of the mold and the end edge of the reinforcing member is secured to the inner surface of the mold by the securing means (a reinforcing member disposing process) and then, the foam-molded body is foam-molded in the mold (a foam-molding process). In a state in which the end edge of the reinforcing member is secured to the inner surface of the mold in the reinforcing member disposing process, the tension is applied to the end edge of the reinforcing member in a direction to separate from the securing means by the tension application means. This tension causes a peripheral portion of a portion of the end edge of the reinforcing member secured to inner surface of the mold by the securing means to be tensed and be in close contact with the inner surface of the mold. Therefore, since the end edge of this reinforcing member may be in sufficiently close contact with the inner surface of the mold without the need of providing a greater number of securing means which are arranged at narrower intervals, the number of securing means to be provided at the end edge of the reinforcing member may be reduced, and the operation to attach the reinforcing member to the inner surface of the mold may be made easier. It is possible that not only the portion secured to the inner surface of the mold by the securing means but a portion of the end edge of the reinforcing member which is not secured by the securing means is made to be in close contact with the inner surface of the mold. Therefore, it is possible to sufficiently prevent rising of the end edge of the reinforcing member from the inner surface of the mold, entering of the foam synthetic resin between the reinforcing member and the inner surface of the mold, and wrinkling of the reinforcing member in the foam-molding process. Therefore, the foam-molded member produced by the method for producing a foam-molded member of the present invention has the reinforcing member integrated precisely on the surface of the foam-molded body.

According to the second aspect, plural securing means may be provided at intervals along a direction in which the end edge of the reinforcing member extends. In this case, since the end edge of the reinforcing member is tensed between plural securing means by the tension applied by the tension application means and is made to be in close contact with the inner surface of the mold, it is possible to make the end edge of the reinforcing member be in close contact with the inner surface of the mold in a wide range.

According to the third aspect, the end edge of the reinforcing member may be disposed with at least a part of the end edge thereof facing downward on the inner surface of the mold. Typically, in the foam-molding process, the foam synthetic resin raw material is poured into a bottom portion of the mold and is made to foam. If the end edge of the reinforcing member is disposed facing downward on the inner surface of the mold, the foam synthetic resin expanding upward from the bottom portion of the mold may easily enter between the reinforcing member and the inner surface of the mold through the end edge of this reinforcing member. The present invention is advantageous in that, since the portion of the end edge of this reinforcing member which is not secured to the inner surface of the mold by the securing means is also tensed by tension applied by the tension application means and is made to be in close contact with the inner surface of the mold, entering of the foam synthetic resin between the reinforcing member and the inner surface of the mold through the end edge of this reinforcing member may be sufficiently prevented.

According to the fourth aspect, the securing means preferably includes a magnet provided in one of the reinforcing member and the inner surface of the mold, and a magnetic body provided in the other. The magnetic body is capable of being attracted by the magnet. Such a securing means has a simple structure and the operation to secure the reinforcing member to the inner surface of the mold may be performed easily.

According to the fifth aspect, the tension application means is preferably constituted by a projecting portion which projects from the inner surface of the mold so that a portion of the reinforcing member further distanced from the end edge of the reinforcing member than the securing means is separated from the inner surface of the mold. In this case, in a state in which the end edge of the reinforcing member is secured to the inner surface of the mold by the securing means, since the portion of the reinforcing member further distanced from the end edge of the reinforcing member than the securing means is pressed in the direction to separate from the inner surface of the mold by this projecting portion, tension is applied to the end edge of the reinforcing member to draw the end edge toward the projecting portion side and the edge of the reinforcing member is tensed by this tension. The tension application means constituted by such a projecting portion is simple in structure.

In this case, according to the sixth aspect, the projection height T of the projecting portion from the inner surface of the mold is preferably 3 to 15 mm. If this projection height T is smaller than 3 mm, there is a possibility that, in a state in which the end edge of the reinforcing member is secured to the inner surface of the mold, the reinforcing member is not sufficiently tensed even if the reinforcing member is pressed in the direction to separate from the inner surface of the mold by the projecting portion. If this projection height T is greater than 15 mm, there is a possibility that the reinforcing member is pressed by the projecting portion and is excessively separated from the inner surface of the mold and, therefore, it is difficult to sufficiently secure the reinforcing member to the inner surface of the mold by the securing means, or excessive load is applied to the reinforcing member and the securing means.

According to the seventh aspect, the distance $D_1$ between this projecting portion and the securing means is preferably 50 mm or less. If this distance $D_1$ is greater than 50 mm, there is a possibility that, in a state in which the end edge of the reinforcing member is secured to the inner surface of the mold, the reinforcing member is not sufficiently tensed even if the reinforcing member is pressed in the direction to separate from the inner surface of the mold by the projecting portion. Preferably, the projecting portion and the securing means are disposed so as not to be placed over each other (that is, the distance $D_1$ is determined to be 0 mm or greater). By disposing the projecting portion and the securing means in this manner, interference between the projecting portion and the securing means is prevented. If the securing means interferes with the projecting portion, there is a possibility that sufficiently securing the reinforcing member to the inner surface of the mold by the securing means is difficult or excessive load is applied to the reinforcing member and the securing means.

According to the eighth aspect, an outer surface of the projecting portion on the side of a tip in a projecting direction is preferably shaped to reduce a width W thereof along a direction to approach and separate from the securing means toward the tip side. With this configuration, the contact area of this projecting portion and the reinforcing member is small when the reinforcing member is placed over the projecting portion. Therefore, greater tension is applied to the end edge of the reinforcing member and the end edge of the reinforcing member is more strongly tensed.

Further, according to the ninth aspect, a part of the reinforcing member which is further distanced from the end edge of the reinforcing member than the projecting portion is at least partially secured to the inner surface of the mold. In this case, since both of the end edge side and the opposite side of the reinforcing member are secured, via the projecting portion, to the inner surface of the mold by the securing means, the reinforcing member is pressed more strongly against the projecting portion and thus greater tension is applied to the end edge of the reinforcing member from the projecting portion. Therefore, the end edge of the reinforcing member may be tensioned more strongly.

According to the eleventh aspect, the present invention is suitable for manufacturing a foam-molded member provided with a reinforcing member of which at least an end edge is made of nonwoven fabric.

According to the twelfth aspect, the present invention is suitable for manufacturing a seat pad as this foam-molded member.

BRIEF DESCRIPTION OF DRAWINGS

FIG. 1b is a cross-sectional view along a B-B line of FIG. 1a.

FIG. 2 is a perspective view of a reinforcing member provided in the seat pad of FIG. 1a and FIG. 1b.

FIG. 3 is an enlarged view of a portion III of FIG. 2.

FIG. 8a illustrates a state before the reinforcing member is attached, and FIG. 8b illustrates a state after the reinforcing member is attached.

FIG. 9 is a cross-sectional view of the entire mold illustrating a state after the reinforcing member is attached to the mold and the mold is clamped; the mold includes the same portion as those illustrated in FIG. 8a and FIG. 8b.

FIG. 12a illustrates a state before the reinforcing member is attached, and FIG. 12b illustrates a state after the reinforcing member is attached.

FIG. 15d is a cross-sectional view along an XVD-XVD line of FIG. 8a.

DESCRIPTION OF EMBODIMENTS

Hereinafter, embodiments of the present invention will be described with reference to the drawings. In the following embodiment, a mold for foam molding and a back pad which constitutes a seat back portion of a seat pad which constitutes a vehicle seat as a foam-molded member produced by a method for producing a foam molded member according to the present invention are described as examples. The present inventions is applicable also to a mold for foam-molding a seat pad other than the back pad (for example, a cushion pad which constitutes a seat portion of a seat), a seat pad for constituting various seats other than that for a vehicle, or a foam-molded member other than the seat pad, and a method for producing the same.

[First Embodiment]

Figure 1A:
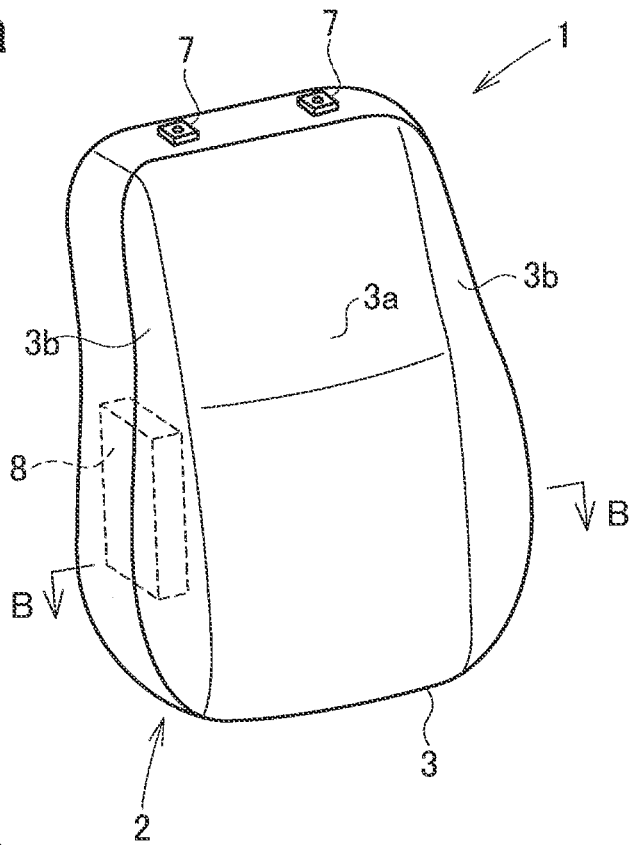
FIG. 1a is a perspective view of a mold for foam molding and a seat pad as a foam-molded member produced by a method for producing a foam-molded member according to a first embodiment.
Figure 1B:
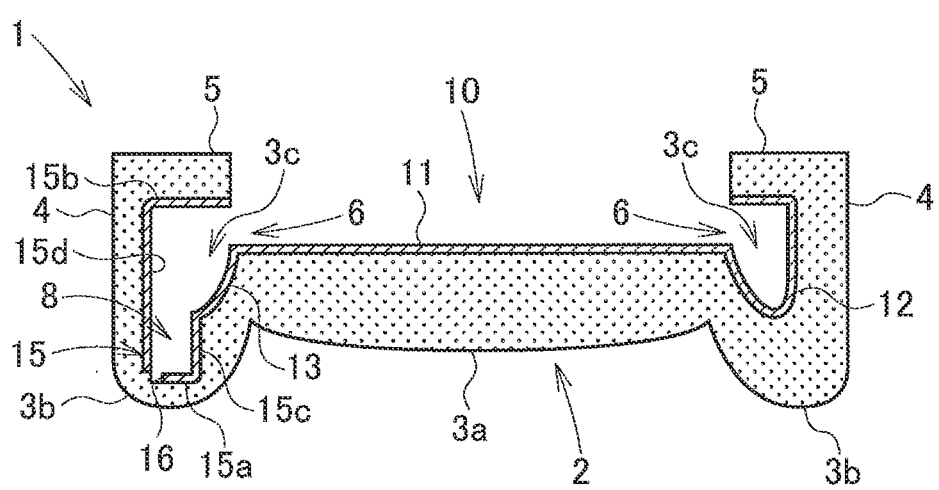
Figure 4:
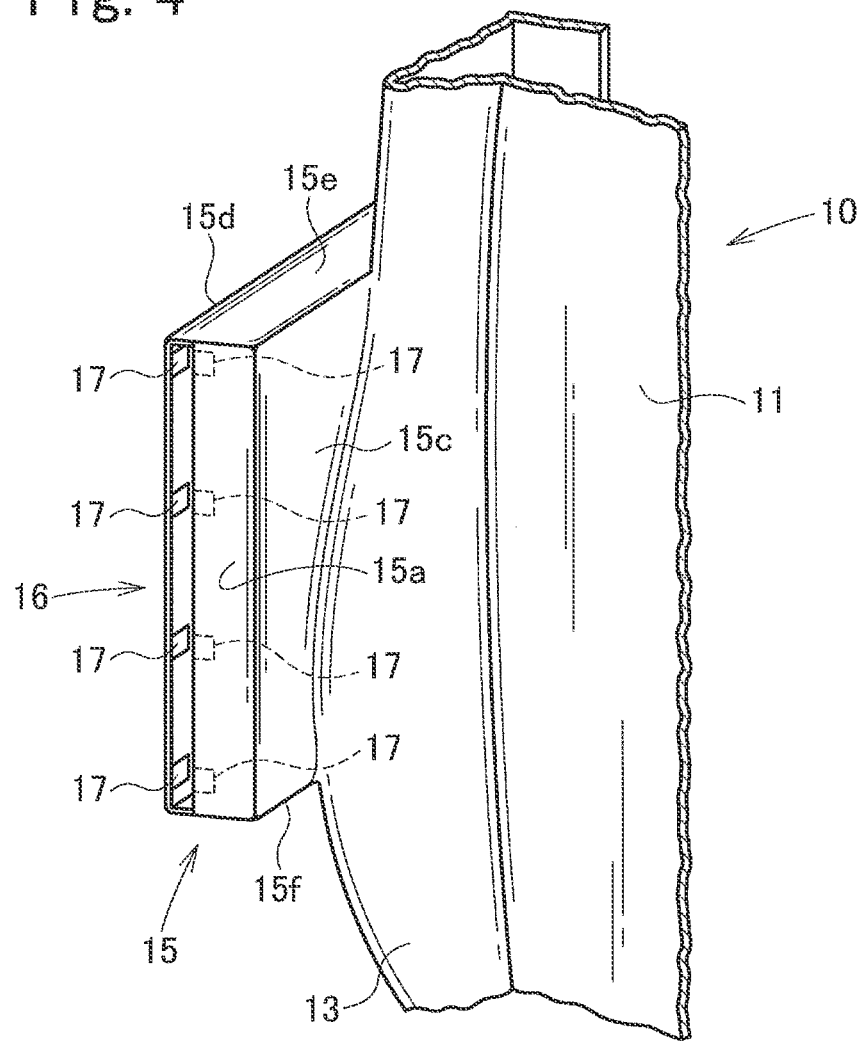
FIG. 4 is a perspective view of the same portion as that of FIG. 3 seen from an IV direction of FIG. 3.
Figure 5:
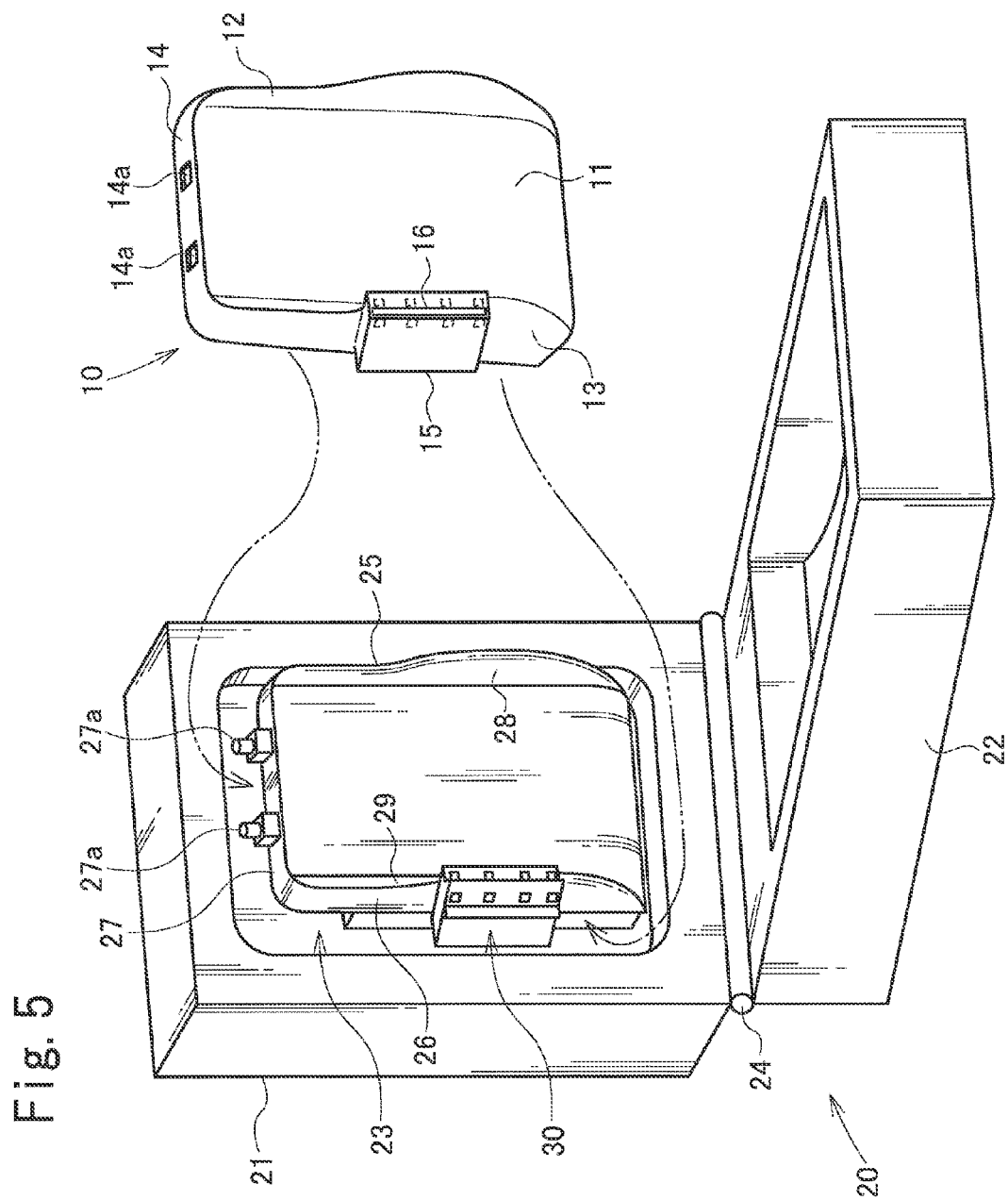
FIG. 5 is a perspective view of the mold for foam-molding the seat pad with the reinforcing member of FIG. 1 and the reinforcing member provided in this seat pad.
Figure 6:
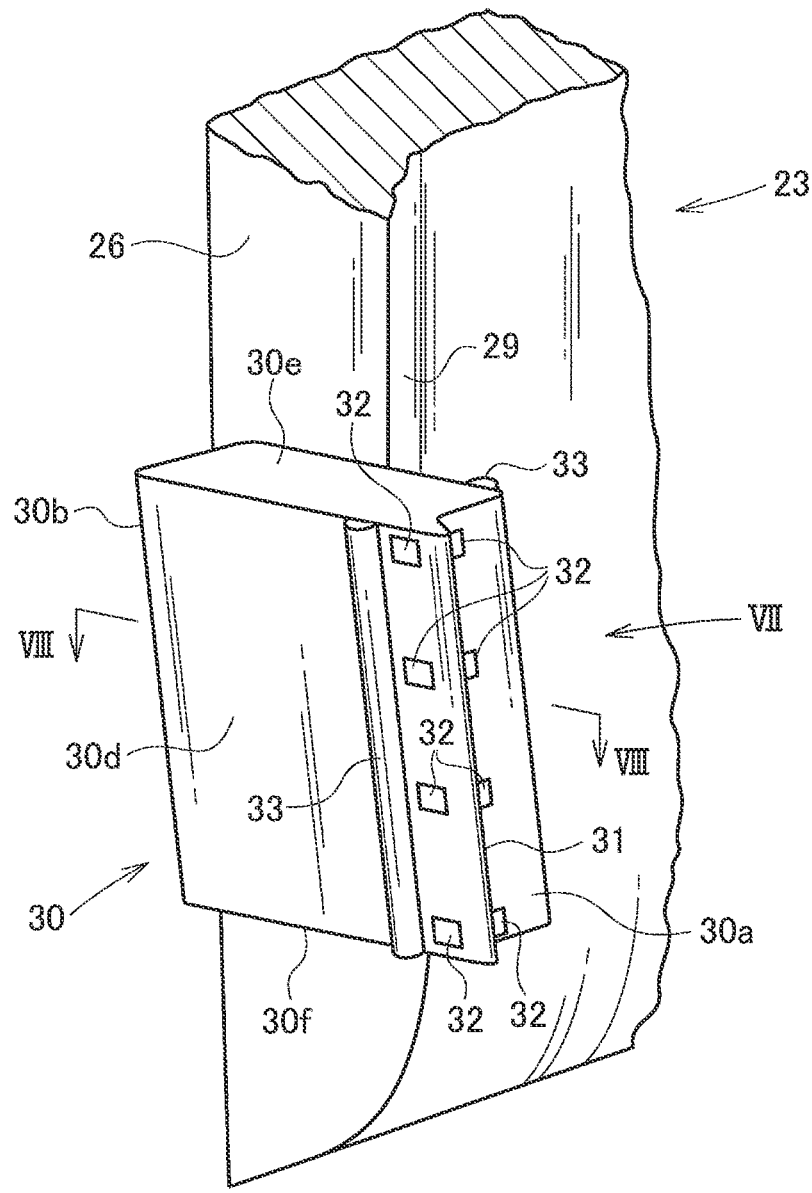
FIG. 6 is a perspective view of an area near a projection for forming an airbag device housing space of the mold of FIG. 5.
Figure 7:
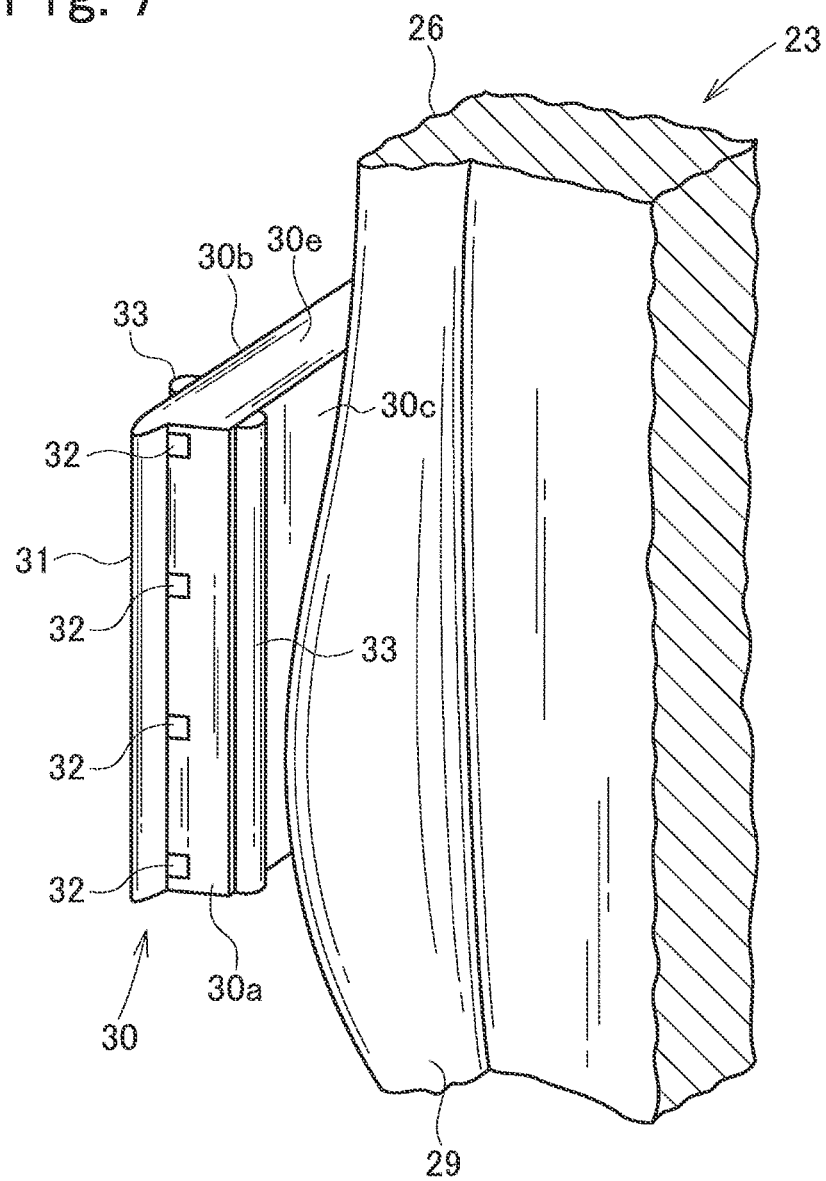
FIG. 7 is a perspective view of the same portion as that of FIG. 6 seen from a VII direction of FIG. 6.
Figure 8A:
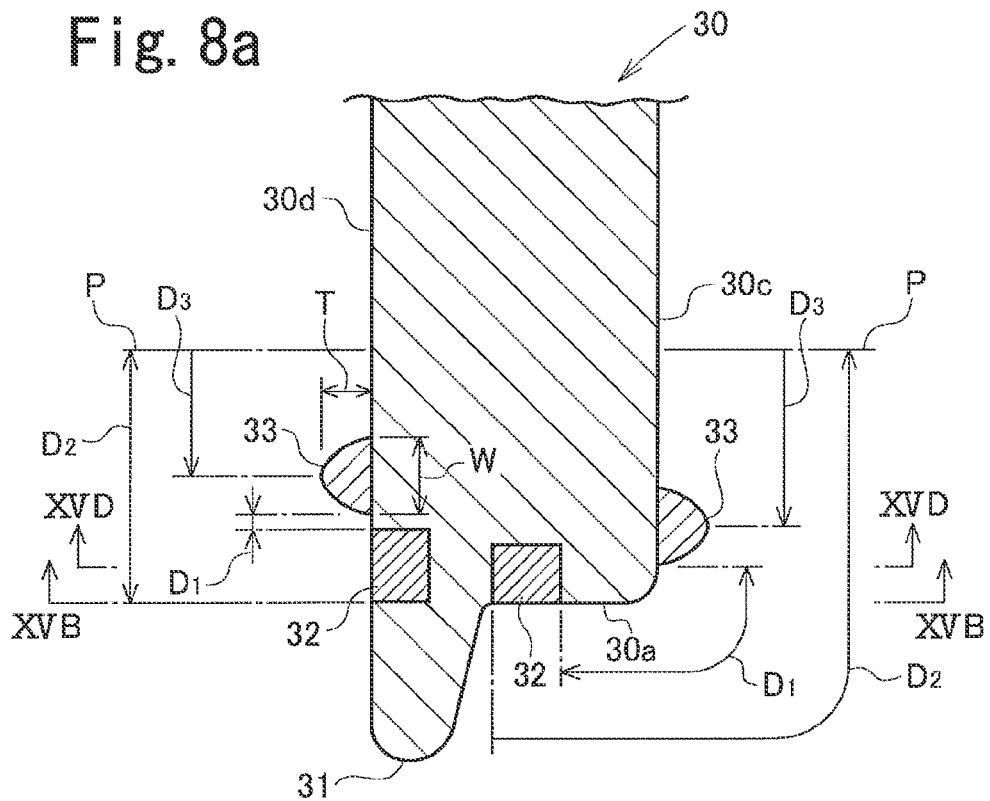
FIG. 8a and FIG. 8b are each a cross-sectional view of an area near a front end of the projection for forming an airbag device housing space along a VIII-VIII line of FIG. 6.
Figure 8B:
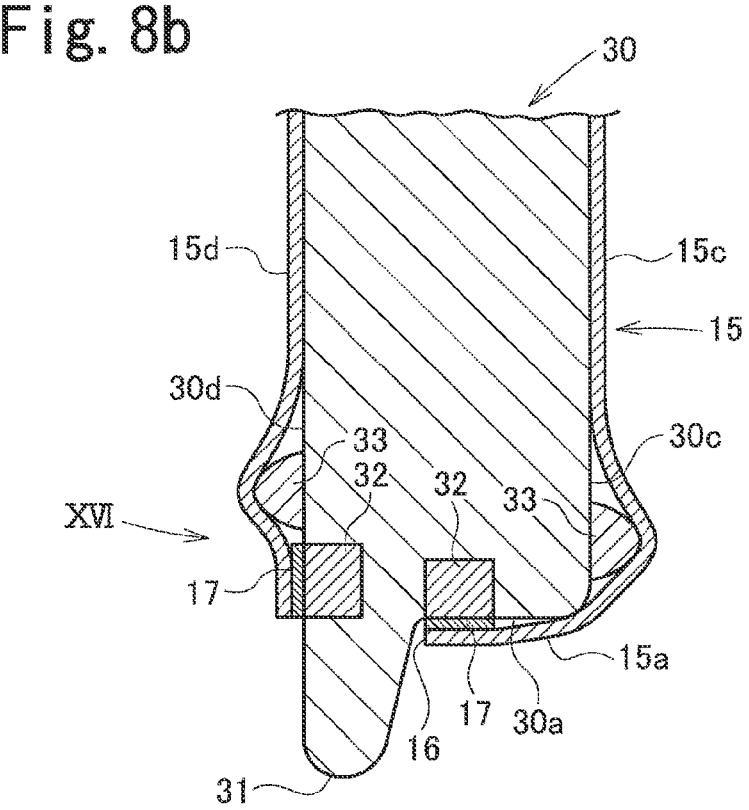
Figure 10:
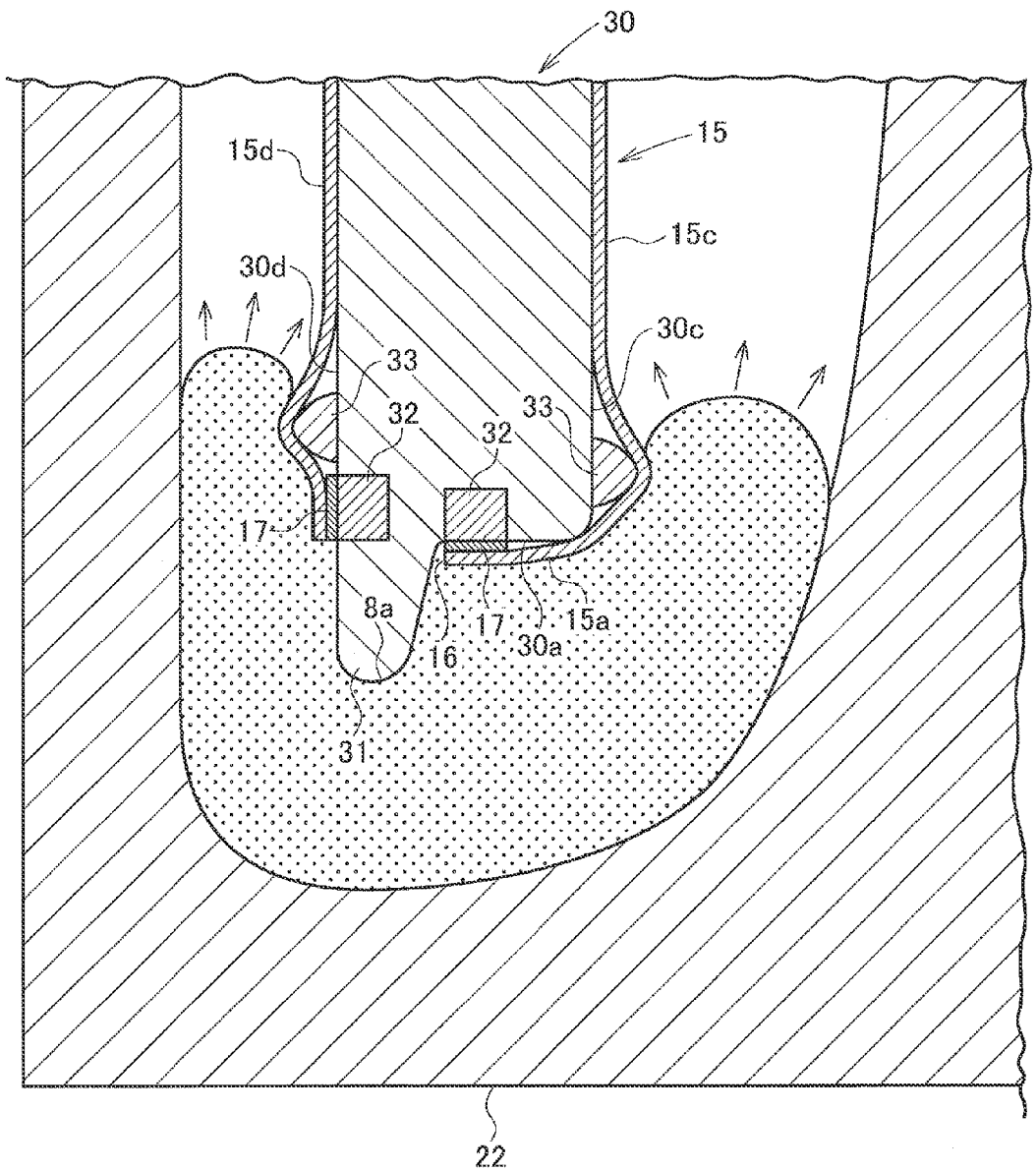
FIG. 10 is an enlarged sectional view of an X portion of FIG. 9, illustrating a state in a process in which the seat pad main body as a foam-molded body is foam-molded.
Figure 15A:
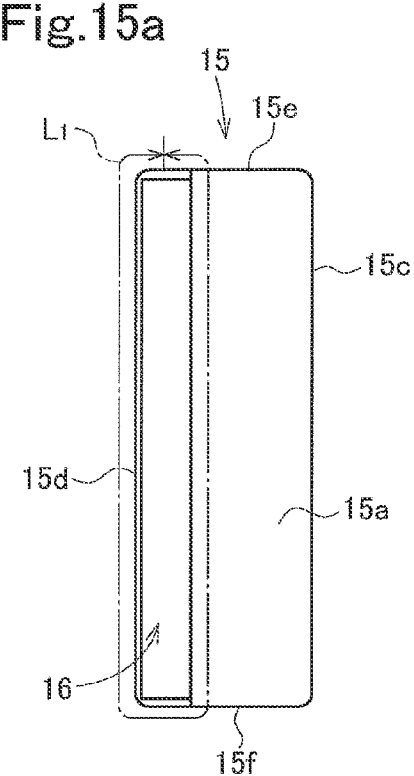
FIG. 15a is a front view of a disposing portion of the reinforcing member in the airbag device housing room.
Figure 15B:
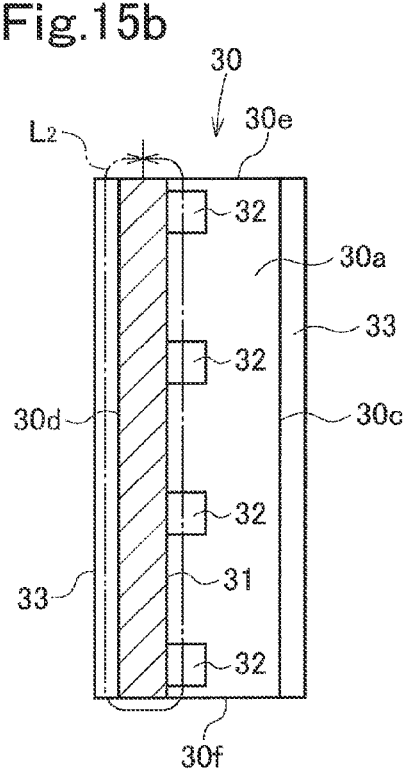
FIG. 15b is a cross-sectional view along an XVB-XVB line of FIG. 8b.
Figure 15C:
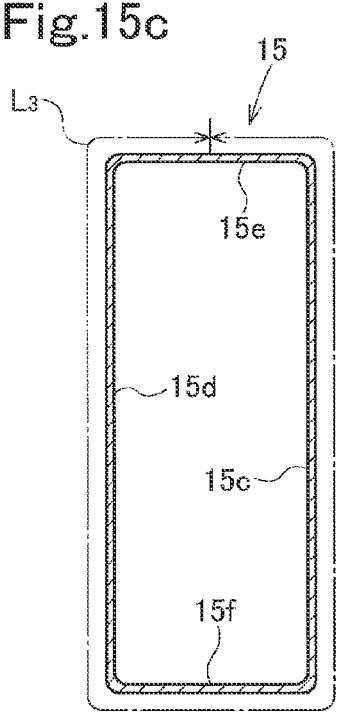
FIG. 15c is a cross-sectional view at a position corresponding to FIG. 15d of the reinforcing member.
Figure 15D:
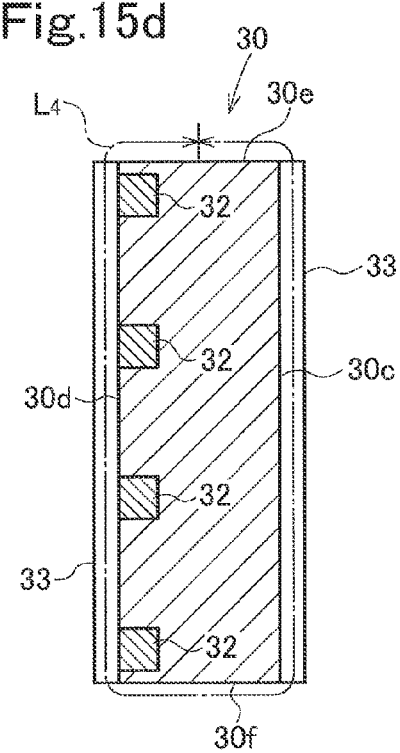
Figure 16:
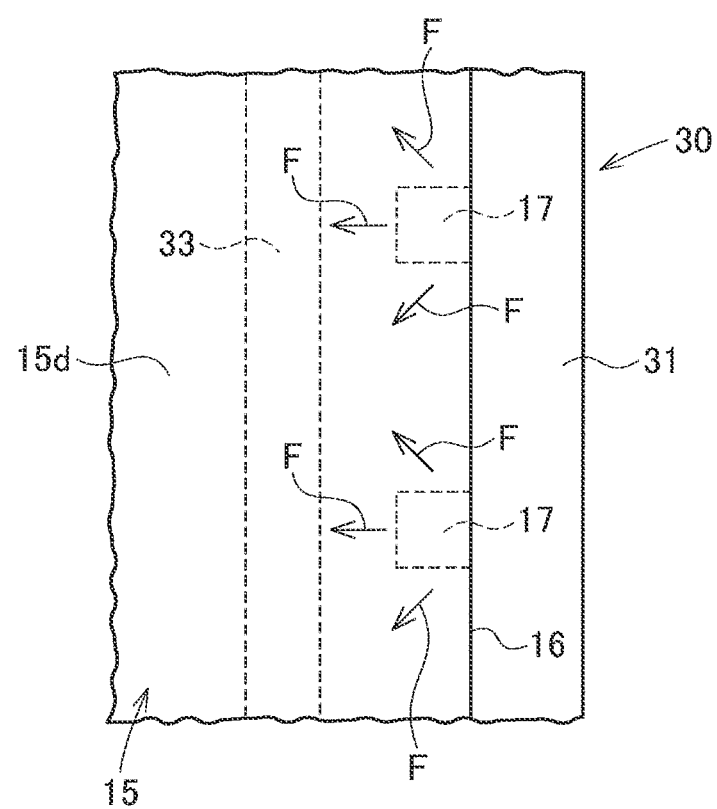
FIG. 16 is a side view of a XVI portion of FIG. 8b.

FIG. 1a is a perspective view of a mold for foam molding and a seat pad as a foam-molded member produced by a method for producing a foam molded member according to a first embodiment; FIG. 1b is a cross-sectional view along a B-B line of FIG. 1a; FIG. 2 is a perspective view of a reinforcing member provided in this seat pad; FIG. 3 is an enlarged view of a portion III of FIG. 2; FIG. 4 is a perspective view of the same portion as illustrated in FIG. 3 seen from the IV direction of FIG. 3; FIG. 5 is a perspective view of a mold used for manufacturing this seat pad and the reinforcing member provided in this seat pad; FIG. 6 is a perspective view of an area near a projection for forming an airbag device housing space of this mold; FIG. 7 is a perspective view of the same portion as illustrated in FIG. 6 seen from a VII direction of FIG. 6; FIGS. 8a and 8b are each a cross-sectional view of an area near a front end of the projection for forming an airbag device housing space along a VIII-VIII line of FIG. 6; FIG. 9 is a cross-sectional view of the entire mold illustrating a state after the reinforcing member is attached to the mold and the mold is clamped; the mold includes the same portion as that illustrated in FIG. 8a; FIG. 10 is an enlarged sectional view of an X portion of FIG. 9. FIG. 8a illustrates a state before the reinforcing member is attached, and FIG. 8b illustrates a state after the reinforcing member is attached; in FIG. 9, illustration of a magnet and a magnetic body as a reinforcing member securing means is omitted; FIG. 10 illustrates a state in a process in which a seat pad main body as the foam-molded body is foam-molded; FIG. 15a is a front view of a disposing portion of the reinforcing member in the airbag device housing room; FIG. 15b is a cross-sectional view along an XVB-XVB line of FIG. 8b; FIG. 15c is a cross-sectional view of the reinforcing member at a position corresponding to FIG. 15d; FIG. 15d is a cross-sectional view along an XVD-XVD line of FIG. 8a; FIG. 16 is a side view of an XVI portion of FIG. 8b. Hereafter, the up-down direction, the left-right direction, and the front-rear direction shall correspond to the up-down direction, the left-right direction, and the front-rear direction for a person seated on the seat constituted using this seat pad.

In this embodiment, the foam-molded member is a seat pad 1 which constitutes a vehicle seat. In this embodiment, the seat pad 1 is especially a back pad which constitutes a seat back portion of the seat. This seat pad 1 is provided with a seat pad main body 2 which consists of foam synthetic resin, such as polyurethane foam, and a planar reinforcing member 10 disposed along a rear surface of the seat pad main body 2. The reinforcing member 10 is integrated with the seat pad main body 2. A structure of a mold 20 for foam-molding the seat pad main body 2 and a method for producing the seat pad 1 using this mold 20 will be described in detail later. An outer surface of this seat pad 1 is covered with a surface material (illustration thereof is omitted), and the seat pad 1 is attached to a back frame (illustration thereof is omitted) of the seat. In this embodiment, the seat pad 1 is used for a right-side seat of a vehicle. The seat pad 1 may be used for a left-side seat by reversing the left and right of the structure described below.

A structure of the seat pad 1 will be described first. As illustrated in FIGS. 1a and 1b, the seat pad main body 2 is provided with a main body portion 3 which covers a front surface of the back frame, projecting portions 4 each of which projects rearward from an upper side and left and right sides of the main body portion 3, and a flange portion 5 which projects from rear ends of the projecting portions 4 toward the center of a rear surface of the main body portion 3. The main body portion 3, the projecting portions 4, and the flange portion 5 are formed integrally with one another. The projecting portions 4 and the flange portion 5 are formed successively along the upper side and the left and right sides of the rear surface of the main body portion 3. A space surrounded by the main body portion 3, the projecting portion 4 and the flange portion 5 is formed as a recessed portion 6 in which each of an upper portion and left and right side portions of the back frame are made to fit. This recessed portion 6 opens toward the center of the rear surface of the main body portion 3. A headrest mounting hole 7 in which a support leg of a headrest (illustration thereof is omitted) is inserted is provided in the projecting portion 4 along an upper side of the main body portion 3. This headrest mounting hole 7 penetrates the projecting portion 4 in a substantially up-down direction and communicates with the recessed portion 6. The support leg of the headrest is inserted in this headrest mounting hole 7 from above the seat pad 1 attached to the back frame, and is connected to the back frame.

The main body portion 3 is provided with a back leaning portion 3a with which a person seated on the seat is in contact, and a pair of side support portions 3b provided at left and right sides of the back leaning portion 3a. As illustrated in FIG. 1b, a groove 3c is formed on a rear surface of each of the side support portions 3b. Each groove 3c extends in the up-down direction. Each groove 3c faces inside the recessed portion 6 and the left and right side portions of the back frame inserted in the left and right recessed portions on the rear side of the seat pad main body 2 engages this groove 3c.

As illustrated in FIGS. 1a and 1b, in this embodiment, an airbag device housing room 8 for storing an airbag device (illustration thereof is omitted) is formed inside the right side support portion 3b of the person seated on the seat. This airbag device housing room 8 communicates with the groove 3c of the rear surface of the right side support portion 3b. The airbag device is used to inflate and deploy the airbag between the person seated on the seat and a side surface of a vehicle compartment at the time of side collision or overturn of the vehicle. In this embodiment, a groove-shaped to-be-ruptured portion 8a (FIG. 10) for rupturing the front surface of the right side support portion 3b when the airbag inflates is formed on a wall surface of the front side inside the airbag device housing room 8. The airbag device is configured in the following manner: when the airbag starts inflating, the airbag ruptures the front surface of the right side support portion 3b (and a surface material which covers the front surface of the side support portion 3b) along the to-be-ruptured portion 8a from inside the airbag device housing room 8 and expands toward between the person seated on the seat and the side surface of the vehicle compartment. This airbag device is attached to the side portion of the back frame, and is disposed inside the airbag device housing room 8 via the recessed portion 6 and the groove 3*c* when the seat pad 1 is assembled to the back frame.

In this embodiment, the airbag device housing room 8 is formed between the groove 3*c* of the rear surface of the right side support portion 3*b* and the right side surface of the seat pad main body 2 as illustrated in FIG. 1*b*. In this embodiment, the airbag device housing room 8 is formed in a substantially rectangular solid shape extending substantially parallel with the groove 3*c*. As illustrated in FIG. 1*b*, the depth toward the front of the airbag device housing room 8 from the rear surface of the back leaning portion 3*a* is greater than the groove 3*c*, and the airbag device housing room 8 extends further toward the front of the groove 3*c*. A rear portion of this airbag device housing room 8 communicates with the groove 3*c*. This airbag device housing room 8 itself is not exposed to an outer surface of the seat pad main body 2 and communicates with the exterior of the seat pad main body 2 only via the groove 3*c* and the recessed portion 6.

The structure of each portion of the seat pad main body 2, and the arrangement and the shape of the airbag device housing room 8 are not limited to these.

In this embodiment, the reinforcing member 10 is made of nonwoven fabric. The material which constitutes the reinforcing member 10 is not limited to nonwoven fabric. In this embodiment, the reinforcing member 10 is provided with a main piece portion 11, left and right side piece portions 12 and 13, an upper piece portion 14, and a disposing portion in the airbag device housing room 15. The main piece portion 11 is disposed along the rear surface of the back leaning portion 3*a*. The left and right side piece portions 12 and 13 are each formed to continue from left and right side edges of the main piece portion 11 and disposed along an inner surface of each groove 3*c* and inner side surfaces of the left and right projecting portions 4 and the flange portion 5 (i.e., surfaces which face an inner side of the recessed portion 6). The upper piece portion 14 is formed to continue from the upper side of the main piece portion 11, and is disposed along the projecting portion 4 at an upper side of the back leaning portion 3*a* and the inner surface of the flange portion 5. The disposing portion in the airbag device housing room 15 is formed to continue from the right side piece portion 13 and is disposed along the wall surface inside the airbag device housing room 8. Openings 14*a* which are placed over the headrest mounting hole 7 are provided in the upper piece portion 14. This reinforcing member 10 may be made of a sheet of nonwoven fabric in which the main piece portion 11, each of side piece portions 12 and 13, the upper piece portion 14, and the disposing portion in the airbag device housing room 15 are formed successively, or may be made of small pieces of nonwoven fabric which are sewn together.

If the reinforcing member 10 is fabricated by nonwoven fabric, a material of the nonwoven fabric is preferably interlaced fiber bundles of, such as polyethylene and polypropylene. The weight per unit area of this nonwoven fabric is preferably about 60 to 200 g/m$^2$ and especially preferably about 100 to 140 g/m$^2$.

In this embodiment, the disposing portion in the airbag device housing room 15 is formed as a bag which includes a front surface portion 15*a*, a rear surface portion 15*b*, a left surface portion 15*c*, a right surface portion 15*d*, an upper surface portion 15*e*, and a lower surface portion 15*f* along front, rear, left, right, upper and lower wall surfaces of the airbag device housing room 8, respectively. A communication port (illustration thereof is omitted) which communicates with the inside of this disposing portion in the airbag device housing room 15 is formed in a side surface of the right side piece portion 13 (hereinafter, referred to as a "right piece portion 13"). A left edge of the rear surface portion 15*b*, a rear edge of the left surface portion 15*c*, and a left edge on the side of the rear ends of the upper surface portion 15*e* and the lower surface portion 15*f* each communicates with the peripheral edge portion of this communication port.

In this embodiment, an opening 16 is disposed in the front surface portion 15*a* of the disposing portion in the airbag device housing room 15 so as to be placed over the to-be-ruptured portion 8*a*. The opening 16 allows rupture of the front surface of the side support portion 3*b* when the airbag inflates. In this embodiment, the opening 16 is formed as a groove extending from an upper end side to the lower end side of the front surface portion 15*a* along the right edge of the front surface portion 15*a*. The shape and arrangement of the opening 16 are not limited to these.

In this embodiment, magnetic bodies 17 are provided in a back side or a front side of each of the right edge of the front surface portion 15*a* and the front edge of the right surface portion 15*d*, among peripheral edge portions (i.e., end edges) of the opening 16. The magnetic bodies 17 are capable of being attracted to a magnet 32 provided in a later-described mold 20. The following, for example, may be used as this magnetic body 17: a magnetic metal piece; a magnetic sheet consisting of, for example, synthetic resin which contains a magnetic material; or a magnet which has a magnetic pole opposite to that of a surface (i.e., a surface exposed inside the mold 20) of the magnet 32. If the mold 20 is made by a magnetic material which is capable of being attracted to a magnet, the magnet may be attached to each of the back side or the front side of the right edge of the front surface portion 15*a* and the front edge of the right surface portion 15*d*, respectively, as the magnetic body 17. A method for attaching this magnetic body (or the magnet: the same in the following) 17 to the reinforcing member 10 includes, for example, sewing, adhering and sticking. However, the method is not limited to these and various methods of attaching may be employed. Instead of attaching the magnetic body 17 to the reinforcing member 10, magnetic property may be applied to fiber system material itself which constitutes the reinforcing member 10 at a portion of the reinforcing member 10 which at least is placed over the magnet 32 as described in the above-described Japanese Patent Publication 2001-252930 A. Although the magnetic body 17 is disposed on the back side (i.e., a surface which is placed over the inner surface of the mold 20) of the peripheral edge portion of the opening 16 in FIGS. 3, 4, 8*a*, 8*b* and 10, the magnetic body 17 may be disposed on the front side (i.e., a surface opposite to the mold 20 via the reinforcing member 10).

In this embodiment, plural small piece-shaped magnetic bodies 17 are disposed at intervals along a direction in which these edge portions extend (in this embodiment, the substantially up-down direction) on the back side (or the front side: the same in the following) of the right edge of the front surface portion 15*a*, and the front edge of the right surface portion 15*d*. The distance between the magnetic bodies 17 adjoining in the direction in which the edge portions extend is preferably 300 mm or shorter and especially preferably 150 mm or shorter. If the distance between adjoining magnetic bodies 17 is longer than 300 mm, there is a possibility that sufficient tension is not applied to a portion between the magnetic bodies 17 at each edge portion when the disposing portion in the airbag device housing room 15 is attached to a later-described projection for forming an airbag device housing space 30 of the mold 20. The distance between these magnetic bodies 17 is preferable as short as possible. However, if the distance is shorter, a greater number of magnetic bodies 17 are required. Thus, the distance is preferably about 30 to 200 mm and especially preferably about 50 to 150 mm. If the distance between adjoining magnetic bodies 17 is 0 to 200 mm, it is possible to apply sufficient tension to the portion between the magnetic bodies 17 at each edge portion when the disposing portion in the airbag device housing room 15 is attached to the projection for forming an airbag device housing space 30 of the mold 20. The width of each magnetic body 17 along the direction in which each edge portion extends (i.e., the substantially up-down direction) is preferably 5 to 300 mm, especially preferably 10 to 250 mm.

The magnetic bodies 17 provided on the back side of the right edge of the front surface portion 15a are disposed such that the right ends thereof are positioned along the right edge of the front surface portion 15a. The magnetic body 17 provided on the back side of the front edge of the right surface portion 15d are disposed such that the front ends thereof are positioned along the front edge of the right surface portion 15d. The width of each magnetic body 17 along a direction in which the magnet body 17 separates from the right edge of the front surface portion 15a and the front edge of the right surface portion 15d (i.e., the width each magnetic body 17 in the left-right direction at the front surface portion 15a, and the width of each magnetic body 17 in a substantially front-rear direction at the right surface portion 15d) is preferably 5 to 20 mm, and especially preferably 10 to 15 mm.

Although four magnetic bodies 17 are provided along the right edge of the front surface portion 15a and the front edge of the right surface portion 15d, respectively, in FIGS. 2 to 4, the number and arrangement of the magnetic bodies 17 are not limited to these. For example, 1 to 3 or five or more magnetic bodies 17 may be provided along the right edge of the front surface portion 15a, and along the front edge of the right surface portion 15d, respectively. The number and arrangement of the magnetic bodies 17 at the front surface portion 15a may differ from those at the right surface portion 15d. The magnetic bodies 17 may be formed to successively extend along the right edge of the front surface portion 15a and extend from the upper end to the lower end of the front edge of the right surface portion 15d. Although no magnetic body 17 is disposed at the front edge of the upper surface portion 15e and the front edge of the lower surface portion 15f among the peripheral edge portion of the opening 16 In this embodiment, the magnetic bodies 17 may be disposed at the front edge of the upper surface portion 15e and on the back side of front edge of the lower surface portion 15f. The magnetic bodies 17 may be disposed to extend along the entire circumstance of the peripheral edge portion of the opening 16 (i.e., extend successively along the right edge of the front surface portion 15a, the front edge of the upper surface portion 15e, the front edge of the right surface portion 15d, and the front edge of the lower surface portion 15f).

Although illustration thereof is omitted, the magnetic bodies 17 are provided at not only the back side of the peripheral edge portion of this opening 16, but at other important points, which include the back side of other end edges of the reinforcing member 10 (for example, outer peripheral edges of the reinforcing member 10, such as a lower end edge of the main piece portion 11, a left end edge of the left piece portion 12, a right end edge of the right piece portion 13, and an upper end edge of the upper piece portion 14, and the peripheral edge portion of an opening other than the opening 16 (including notches and the like).

Next, a structure of the mold 20 for foam-molding the seat pad 1 provided with this reinforcing member 10 will be described. As illustrated in FIG. 5, in this embodiment, the mold 20 is provided with an upper mold 21, a lower mold 22, and a core 23 which is set in the upper mold 21. The reference numeral 24 denotes a hinge which connects the upper mold 21 and the lower mold 22. The seat pad main body 2 is foam-molded in this mold 20. In this mold 20, the seat pad main body 2 is fabricated with a front surface (i.e., a surface on the side of a person seated on the seat) facing down. That is, the front surface of the seat pad main body 2 is molded by a cavity surface of the lower mold 22 and a rear surface of the seat pad main body 2 is molded by cavity surfaces of the upper mold 21 and the core 23. The rear surface of the main body portion 3 is molded by a front surface of the core 23 (here, the up-down direction, the left-right direction and the front-rear direction of this core 23 shall correspond to the up-down direction, the left-right direction and the front-rear direction of the seat pad main body 2). Projections 25, 26 and 27 for forming the recessed portion 6 project from left and right side surfaces and the upper surface of the core 23, respectively (hereinafter, these projections 25 to 27 is sometimes referred to as "projections for forming a recess"). These projections 25, 26 and 27 are formed successively from the left and right side surfaces to the upper surface of the core 23. Projecting lines 28 and 29 for forming each groove 3c are formed to protrude from each front surface of the left and right projections 25 and 26. A projection 30 for forming the airbag device housing room 8 is formed to protrude toward the right and front direction from a right side surface (i.e., an end surface in the direction protruding from the core 23) of the right projection 26 (hereinafter, this projection 30 is sometimes referred to as "a projection for forming an airbag device housing space"). This projection 30 is formed in a substantially rectangular solid shape extending in the substantially up-down direction along the side surface of the projection 26 (i.e., formed in a shape corresponding to an internal shape of the airbag device housing room 8). The width of this projection 30 in the front-rear direction is greater than the width of the projection 26 from the rear surface to the front end surface of the projecting line 29, and the projection 30 protrudes further forward than the front end surface of the projecting line 29. A projecting portion 27a for forming the headrest mounting hole 7 projects from an upper end surface of the upper side upper projecting portion 27.

As illustrated in FIG. 9, each of the projections 25 to 27 and 30 is separated apart from the cavity surface of the upper mold 21. In a state in which the upper mold 21 and the lower mold 22 are clamped together, a space exists between the front surface of the core 23 and each of the outer surfaces of the projections 25 to 27 and 30 and the projecting lines 28 and 29 and the cavity surfaces of the upper mold 21 and the lower mold 22. That is, the space between the front surface of the core 23 and the front surface of the upper projecting portion 27, and a bottom surface of the cavity of the lower mold 22 becomes a space for forming the back leaning portion 3a; the space between the front ends of each of the projecting lines 28 and 29 and the projection 30, and the bottom surface of the cavity of the lower mold 22 becomes a space for forming each side support portion 3b; the space between the side surfaces of each of the projections 25 and 26 and the rear portion side surface of the projection 30, and the side surfaces of the cavities of the upper mold 21 and the lower mold 22 become a space for forming the projecting portion 4; and the space between rear surfaces of each of the projections 25 to 27 and 30, and a cavity ceiling surface of the upper mold 21 becomes a space for forming the flange portion 5.

The main piece portion 11 of the reinforcing member 10 is shaped to be capable of being in close contact with the front surface of the core 23 and the front surface of the upper projecting portion 27 successively. The left side piece portion 12 is shaped to be capable of being in close contact with the front surface of the left projecting line 28 of the core 23, and the side and rear surfaces of the projection 25, successively. The right side piece portion 13 is shaped to be capable of being in close contact with the front surface of the right projecting line 29 of the core 23, and the side and rear surfaces of the projection 26, successively. The upper piece portion 14 is shaped to be capable of being in close contact with the upper end surface and the rear surface of the upper projecting portion 27 of the core 23, successively. The disposing portion in the airbag device housing room 15 is shaped to be capable of being in substantially close contact with an outer surface of the projection for forming an airbag device housing space 30 except for an area closest to each projecting portion 33 as a later-described tension application means.

As described above, the projection 30 is formed in a substantially rectangular solid shape which fits to an internal shape of the airbag device housing room 8. The projection 30 has a front surface 30a, a rear surface 30b, a left side surface 30c, a right side surface 30d, an upper surface 30e, and a lower surface 30f, each of which forms a front wall surface, a rear wall surface, a left wall surface, a right wall surface, an upper wall surface, and a lower wall surface of the inside of the airbag device housing room 8 (see FIGS. 6 and 7). If the disposing portion in the airbag device housing room 15 of the reinforcing member 10 is attached to the projection 30, the front surface portion 15a, the rear surface portion 15b, the left surface portion 15c, the right surface portion 15d, the upper surface portion 15e, and the lower surface portion 15f of the disposing portion in the airbag device housing room 15 are placed over the front surface 30a, the rear surface 30b, the left side surface 30c, the right side surface 30d, the upper surface 30e, and the lower surface 30f, respectively. As illustrated in FIGS. 6 to 8a and 8b, in this embodiment, a projecting portion 31 which engages the opening 16 of the front surface portion 15a of the disposing portion in the airbag device housing room 15 is formed to project from the front surface 30a of the projection 30. This projecting portion 31 is formed to extend along the right side of the front surface 30a and from the upper end to the lower end of the front surface 30a. The to-be-ruptured portion 8a is formed by this projecting portion 31.

On the front surfaces 30a and 30d of right side surface of this projection 30, the magnets 32 for attracting each of the magnetic bodies 17 are provided on the back side of the front surface portion 15a and the back side of the right surface portion 15d of the disposing portion in the airbag device housing room 15. In this embodiment, the securing means for securing end edges of the reinforcing member 10 to the inner surface of the mold 20 is constituted by the magnets 32 and the magnetic bodies 17. Each of the magnets 32 is disposed at a position to be placed over each of the magnetic bodies 17 when the disposing portion in the airbag device housing room 15 is attached to the projection 30. In this embodiment, as many magnets 32 as the magnetic bodies (four in this embodiment) are disposed at intervals along the substantially up-down direction on each of the front surface 30a and the right side surface 30d. The magnetic bodies 17 are disposed at the front surface portion 15a and the right surface portion 15d of the disposing portion in the airbag device housing room 15. The size of each magnet 32 and the distance between the magnets 32 adjoining in the up-down direction are the same as the size of the magnetic body 17 and the distance between the magnetic bodies 17 adjoining in the up-down direction. As illustrated in FIGS. 8a and 8b, each magnet 32 on the front surface 30a is disposed such that the right end thereof is positioned along the base of the projecting portion 31. Each magnet 32 on the right side surface 30d is disposed such that the front end thereof is positioned along the front surface 30a. In this embodiment, as illustrated in FIGS. 8a and 8b, each magnet 32 is attached to the core 23 so as to be embedded in a recessed portion (the reference numeral is omitted) formed on the front surface 30a and the right side surface 30d. The surface of each magnet 32 (i.e., the surface exposed to the inner surface of the mold 20) is on substantially the same surface with the front surface 30a and the right side surface 30d. The number of and arrangement of the magnets 32 are not limited to these. For example, the magnets 32 may be disposed successively from the upper ends to the lower ends of the front surface 30a and the right side surface 30d. The number of the magnets 32 and the number of the magnetic bodies 17 need not necessarily the same. That is, one magnet 32 may be disposed to be placed over plural magnetic bodies 17 successively, and one magnetic body 17 may be attracted by plural magnets 32. The magnetic bodies 17 may be provided also on the back side of the front edge of the upper surface portion 15e and the back side of the front edge of the lower surface portion 15f of the disposing portion in the airbag device housing room 15 which face the opening 16, and the magnets 32 may be provided to be placed over these magnetic bodies 17 on the upper surface portion 30e and the lower surface portion 30f of the projection 30. The magnets 32 may be disposed successively on the front surface 30a, the upper surface 30e, the right side surface 30d, and the lower surface 30f of the projection 30 over which the peripheral edge portion of the opening 16 is placed.

Although illustration is omitted, the magnets 32 are provided not only at the positions to meet the magnetic bodies 17 provided at the peripheral edge portion of the opening 16 in the reinforcing member 10 in the core 23 but also at the positions to be placed over the magnetic bodies 17 provided at other end edges of the above-described reinforcing member 10. The core 23 may be made of a magnetic material which is capable of being attracted by the magnet. In that case, it is possible to provide the magnet 32 in the reinforcing member 10 as the magnetic body 17 to thereby omit providing the magnet 32 in the core 23.

In this embodiment, the projecting portions 33 projecting laterally from these side surfaces 30d and 30c are provided in each of the right side surface 30d and the left side surface 30c of the projection 30. On the right side surface 30d, the projecting portions 33 are disposed further rearward than the magnets 32. On the left side surface 30c, the projecting portions 33 are disposed near a projecting corner at which the front surface 30a and the left side surface 30c of the projection 30 cross each other. That is, in the state in which the disposing portion in the airbag device housing room 15 is attached to the projection 30, the projecting portion 33 of the right side surface 30d of the projection 30 is disposed at a position distanced from the peripheral edge portion of the opening 16 of the disposing portion in the airbag device housing room 15 (i.e., the front edge of the right surface portion 15d of the disposing portion in the airbag device housing room 15), which is a position further distanced than the magnet 32 provided on the right side surface 30d, and the projecting portion 33 of the left side surface 30c of the projection 30 is also disposed at a position distanced from the peripheral edge portion of the opening 16 (i.e., the right edge of the front surface portion 15a of the disposing portion in the airbag device housing room 15), which is a position further distanced than the magnet 32 provided on the front surface 30a of the projection 30. Hereafter, in the state in which the disposing portion in the airbag device housing room 15 is attached to the projection 30, the position further distanced from the peripheral edge portion of the opening 16 than each magnet 32 is called the rear side of each magnet 32. In this embodiment, these projecting portions 33 constitute a tension application means for applying tension to the peripheral edge portion of the opening 16 in the direction to separate from each magnetic body 17 in the state in which the disposing portion in the airbag device housing room 15 is attached to the projection 30 and each magnetic body 17 is secured to each magnet 32. Although each projecting portion 33 is formed separately from the projection 30 and is attached to each of the side surfaces 30d and 30c of the projection 30 in this embodiment, the method for forming each projecting portion 33 is not limited to this: for example, each projecting portion 33 may be formed integrally with the projection 30.

In this embodiment, each projecting portion 33 is disposed successively from the upper ends to the lower ends of each of the side surfaces 30d and 30c of the projection 30 as illustrated in FIGS. 6 and 7. In this embodiment, the cross section of each projecting portion 33 in the extending direction and in the orthogonal direction is substantially semicylindrical with outwardly curved outer surface on the side of the tip thereof as illustrated in FIGS. 8a and 8b. The outer surface of each projecting portion 33 is outwardly curved on the side of the tip thereof, the width W of each projecting portion 33 in a direction to approach and separate from the magnet 32 (FIG. 8a) reduces toward each tip. Thus, if each of the side surface portions 15d and 15c of the disposing portion in the airbag device housing room 15 is placed over each projecting portion 33, contact areas between each projecting portion 33 and each of the side surface portions 15d and 15c is small. Therefore, since large stress is applied intensively to the contact portion between each of the side surface portions 15d and 15c and each projecting portion 33 and greater tension is applied to the peripheral edge portion of the opening 16, the peripheral edge portion of the opening 16 is strongly tensed by this tension.

The projection height T (FIG. 8a) of each projecting portion 33 from each of the side surfaces 30d and 30c is preferably 3 to 15 mm and especially preferably 3 to 10 mm. If this projection height T is smaller than 3 mm, when the disposing portion in the airbag device housing room 15 is attached to the projection 30, there is a possibility that the peripheral edge portion of the opening 16 is not sufficiently tensed even if the side surface portions 15d and 15c of the disposing portion in the airbag device housing room 15 is pressed by the projecting portion 33 in the direction to separate from the side surfaces 30d and 30c of the projection 30. If this projection height T is greater than 15 mm, there is a possibility that the side surface portions 15d and 15c of the disposing portion in the airbag device housing room 15 are pressed by the projecting portion 33 and are excessively separated from the side surfaces 30d and 30c of the projection 30 and, therefore, it is difficult to sufficiently attract each magnetic body 17 to each magnet 32, and a portion of the peripheral edge portion of the opening 16 between adjoining magnetic bodies 17 separates from the outer surface of the projection 30.

The width W of the direction to approach and separate from the magnet 32 at a base end portion of each projecting portion 33 is preferably 1 to 100 mm and especially preferably 3 to 50 mm. If this width W is smaller than 1 mm, there is a possibility that rigidity of the mold of the projecting portion 33 is insufficient the projecting portion 33 is deformed. If the width W is larger than 100 mm, there is a possibility that tensile force applied to the reinforcing member 10 is insufficient.

The shape and arrangement of each projecting portion 33 is not limited to these. For example, each projecting portion 33 may be disposed intermittently on the rear side of each magnet 32. In this case, each projecting portion 33 may be disposed at a position facing the rear side of each magnet 32, or may be disposed at a position not facing the rear side of each magnet 32. In this embodiment, although the projecting portions 33 are provided only on the right side surface 30d and the left side surface 30c of the projection 30, the projecting portions 33 may be provided on the upper surface 30e and the lower surface 30f of the projection 30. The projecting portions 33 may be disposed successively on the right side surface 30d, the upper surface 30e, the left side surface 30c, and the lower surface 30f of the projection 30. In this embodiment, as illustrated in FIGS. 8a and 8b, since the front surface 30a of the projection 30 has a relatively narrower rear side (i.e., the left side of the front surface 30a) portion than that of each magnet 32, the projecting portion 30 which should be positioned at the rear side of each magnet 32 of this front surface 30a is disposed on the left side surface 30c of the projection 30. However, if the front surface 30a is sufficiently large, this projecting portion 33 may be disposed on the front surface 30a at the rear side of each magnet 32.

As illustrated in FIGS. 8a and 8b, the distance $D_1$ between each magnet 32 and each magnetic body 17 secured to each magnet 32 and the projecting portion 33 at the rear side of these magnet 32 and magnetic body 17 is preferably 50 mm or less and especially preferably 30 mm or less. If this distance $D_1$ is larger than 50 mm, when the disposing portion in the airbag device housing room 15 is attached to the projection 30 and each magnetic body 17 is secured to each magnet 32, there is a possibility that a portion of the disposing portion in the airbag device housing room 15 separated significantly from each magnetic body 17 is pressed by each projecting portion 33 in the direction to separate from the outer surface of the projection 30 and, therefore, the peripheral edge portion of the opening 16 is not sufficiently tensed. Preferably, each magnet 32 and each projecting portion 33 are disposed so as not to be placed over each other (that is, the distance $D_1$ is determined to be 0 mm or greater). By disposing each magnet 32 in this manner, interference by each magnetic body 17 with the projecting portion 33 when each magnetic body 17 is secured to the each magnet 32 is prevented.

Typically, when the foam-molded body is foam-molded in the mold with the reinforcing member having been attached to the inner surface of the mold, there sometimes is a range of permission of the foam synthetic resin into between the reinforcing member and the inner surface of the mold from the opening and the end edge of this reinforcing member. In FIG. 8a, the range of permission of entry of the foam synthetic resin from the opening 16 in this embodiment is denoted by the reference numeral $D_2$. In this embodiment, the range of permission of entry of foam synthetic resin $D_2$ is preferably 100 mm from the opening 16 and especially preferably 50 mm from the opening 16. Preferably, a furthest tip portion of each projecting portion 33 (i.e., a portion most projected from each of the side surfaces 30d and 30c of the projection 30) is disposed further toward the opening 16 (hereinafter, referred to as a "front side") than a limit position P of this range of permission of entry of foam synthetic resin $D_2$ and, at the same time, further rearward than each magnet 32. With this configuration, if the foam synthetic resin enters from the opening 16 to reach between the disposing portion in the airbag device housing room 15 and the projection 30, this resin is dammed by each projecting portion 33. Therefore, entry of the foam synthetic resin deeper than the limit position P of this range of permission of entry of foam synthetic resin $D_2$ may be prevented. A distance $D_3$ between the limit position P of this range of permission of entry of foam synthetic resin $D_2$ and the furthest tip portion of each projecting portion 33 is preferably 5 to 30 mm and especially preferably 10 to 20 mm.

Preferably, the disposing portion in the airbag device housing room 15 has a shape in accordance with the outer surface of the projection 30 in a state in which no projecting portion 33 is provided. When this disposing portion in the airbag device housing room 15 is attached to the projection 30 provided with the projecting portions 33 and each magnetic body 17 is attached to each magnet 32, the disposing portion in the airbag device housing room 15 is extended by the protrusion of the projecting portion 33, and tension is applied to the peripheral edge portion of the opening 16.

In a state before the disposing portion in the airbag device housing room 15 is attached to the projection 30, a peripheral length $L_1$ of the opening 16 is preferably $L_1$=about $L_2$+5 to 30 mm where $L_1$ represents the peripheral length of the opening 16 (in this embodiment, as illustrated in FIG. 15a, the total length of the front edges of the upper surface portion 15e, the right surface portion 15d and the lower surface portion 15f, and the right edge of the front surface portion 15a of the disposing portion in the airbag device housing room 15 which face the opening 16) and $L_2$ represents a peripheral length of the base end portion of the projecting portion 31 (in this embodiment, as illustrated in FIG. 15b, the total length of the upper side, the left side, the lower side and the right side of the projecting portion 31 at a cross section of the projecting portion 31 cut with a flat surface including the front surface 30a of the projection 30). As illustrated in FIG. 15d, the peripheral length $L_3$ of a portion of this disposing portion in the airbag device housing room 15 disposed near the projecting portion 33 is preferably $L_3$ is about $L_4$+2 to 3 mm where $L_4$ represents the peripheral length of the projection 30 at a cross section of the projection 30 cut at a flat surface parallel to the front surface 30a at a position near each projecting portion 33 (in this embodiment, the total of the left-right direction width of the upper surface 30e of the projection 30 not including each projecting portion 33, the up-down direction width of the right side surface 30d, the left-right direction width of the lower surface 30f and the up-down direction width of the left side surface 30c), and $L_3$ represents the peripheral length before a portion of the disposing portion in the airbag device housing room 15 disposed near the projecting portion 33 is attached to the projection 30 (in this embodiment, as illustrated in FIG. 15c, the left-right direction width of the upper surface portion 15e, the up-down direction width of the right surface portion 15d, the left-right direction width of the lower surface portion 15f and the up-down direction width of the left surface portion 15c). Preferably, the disposing portion in the airbag device housing room 15 is configured such that the peripheral length of the portion thereof disposed near the projecting portion 33 may be increased to about $L_3$+0.5 mm or more and especially about $L_3$+2 to 3 mm as long as the disposing portion in the airbag device housing room 15 (for example, nonwoven fabric which constitutes the disposing portion in the airbag device housing room 15) is not ruptured.

If the disposing portion in the airbag device housing room 15 is made of nonwoven fabric, it is preferred that the nonwoven fabric has the rupture elongation percentage of about 10 to 150% and especially about 60 to 100%.

Next, a method of manufacturing the seat pad 1 using the thus-configured mold 20 for foam molding will be described.

First, as illustrated in FIG. 5, the upper mold 21 and the lower mold 22 are opened and the reinforcing member 10 is attached to the front surface side of the core 23. At this time, the disposing portion in the storage for the airbag device 15 and the right piece portion 13 of the reinforcing members 10 are rolled up in the forward direction in advance. First, the upper piece portion 14 is placed from above over the upper projecting portion 27 of the core 23 while the projecting portion 27a is made to engage the opening 14a of the upper piece portion 14. Then, the left piece portion 12 is placed over the left projection 25 and the projecting line 28 of the core 23. Then, while making the projection 30 enter the disposing portion in the airbag device housing room 15 from the back side of the right piece portion 13 via the communication port, the right piece portion 13 is placed over the right projection 26 and the projecting line 29 of the core 23 such that the disposing portion in the storage for the airbag device 15 and the right piece portion 13 are made to unroll rearward and, at the same time, the disposing portion in the storage for the airbag device 15 is placed over the projection 30. At this time, the projecting portion 31 projecting forward from the front end of the projection 30 is made to engage the opening 16 of the front surface portion 15a of the disposing portion in the airbag device housing room 15 so as to determine the position of the disposing portion in the airbag device housing room 15. Then, each magnetic body 17 provided at the periphery of this reinforcing member 10, the peripheral edge portion of the opening 16 and the like is made to be attracted to each magnet 32 of the core 23 and the reinforcing member 10 is fixed. Thereby, main piece portion 11 of the reinforcing member 10 sticks to front surface of core 23, and left and right side piece portions 12 and 13 and upper piece portion 14 come to stick to outer surface of each of the projections 25 to 27 and projecting lines 28 and 29, respectively. In the disposing portion in the airbag device housing room 15 attached to the projection 30, as illustrated in FIG. 8b, since the side surface portions 15d and 15c are pressed by each projecting portion 33 of the side surfaces 30d and 30c of the projection 30 in the direction to separate from the side surfaces 30d and 30c. Therefore, as illustrated in FIG. 16, tension F is applied to a left semicircle of the peripheral edge portion of the opening 16 so that the left semicircle is drawn toward the projecting portion 33 of the left side surface 30c of the projection 30, and tension F is applied to a right semicircle of the peripheral edge portion of the opening 16 so that the right semicircle is drawn toward the projecting portion 33 of the right side surface 30d of the projection 30. With this tension F, the peripheral edge portion of the opening 16 is tensed between adjoining magnetic bodies 17 and is made to be in close contact with the outer surface of the projection 30. Therefore, the disposing portion in the airbag device housing room 15 is in close contact with the outer surface of the projection 30 along the entire peripheral edge portion of the opening 16 (the process described above is a reinforcing member disposing process).

After this reinforcing member disposing process, a foam synthetic resin raw material is poured into the lower mold 22, and the upper mold 21 and the lower mold 22 are clamped together. Then the foam synthetic resin raw material is made to foam (a foam-molding process). This foam synthetic resin runs through between the side surfaces of the projections 25 to 27 and 30 and the cavity side surfaces of the upper mold 21 and the lower mold 22 and reaches between the rear surfaces of the projection 25 to 27 and 30 and the cavity ceiling surface of the upper mold 21. In this manner, the projecting portion 4 and the flange portion 5 are formed to continue from the main body portion 3. The reinforcing member 10 is integrated with the back surfaces of the projecting portion 4 and the flange portion 5. After curing of this foam synthetic resin, the upper mold 21 and the lower mold 22 are opened and seat pad main body 2 is unmolded. The portions of this seat pad main body 2 at which each of the projections 25 to 27 and the projecting lines 28 and 29 have existed becomes the recessed portions 6 and the grooves 3c, and the portion at which the projection 30 has existed becomes the airbag device housing room 8. The inner surfaces of these recessed portions 6 and the grooves 3c are covered with each of the side piece portions 12 and 13 of the reinforcing member 10. The inner surface of the airbag device housing room 8 is covered with the disposing portion in the airbag device housing room 15 of the reinforcing member 10. After the unmolding, a finishing operation, such as trimming, is performed as needed and then the seat pad 1 is completed.

As described above, according to the method for producing of seat pad 1 using this mold 20 for foam molding, in the state in which the disposing portion in the storage for the airbag device 15 of the reinforcing member 10 is attached to the projection 30 of the mold 20, and each magnetic body 17 provided at the peripheral edge portion of the opening 16 is secured to each magnet 32 of the outer surface of the projection 30, when the side surface portions 15d and 15c of this disposing portion in the airbag device housing room 15 is pressed, by each projecting portion 33 on the side surfaces 30d and 30c of the projection 30, in the direction to separate from the side surfaces 30d and 30c, tension F is applied to the left and right semicircles of the peripheral edge portion of the opening 16 to draw these semicircles toward the projecting portion 33 of the left side surface 30d and the projecting portion 33 of the right side surface 30c of the projection 30, respectively. Since this tension F causes the peripheral edge portion of the opening 16 to be tensed between adjoining magnetic bodies 17 and to be in close contact with the side surfaces 30d and 30c of the projection 30, the peripheral edge portion of the opening 16 may be made to be in close contact with the outer surface of the projection 30 without the need of providing many magnetic bodies 17 and the magnets 32 arranged at narrower intervals on the peripheral edge portion of the opening 16 and on the outer surface of the projection 30. Therefore, the number of magnetic bodies 17 and the magnets 32 to be provided on the outer surface of the peripheral edge portion of the opening 16 and on the projection 30 may be reduced, and the operation to secure the reinforcing member 10 to the projection 30 of the peripheral edge portion of the opening 16 may be made easier. In this manner, it is possible that not only the portion of the peripheral edge portion of the opening 16 secured to the outer surface of the projection 30 by the magnetic body 17 and the magnet 32 but the portion which is not secured by the magnetic body 17 and the magnet 32 may be made to be in close contact with the outer surface of the projection 30. Therefore, it is possible to sufficiently prevent rising of the peripheral edge portion of the opening 16 from the outer surface of the projection 30, entering of the foam synthetic resin between the disposing portion in the airbag device housing room 15 and the outer surface of the projection 30, and wrinkling of the disposing portion in the airbag device housing room 15 in the foam-molding process. Therefore, it is possible to manufacture the seat pad 1 having the reinforcing member 10 integrated precisely on the surface of the seat pad main body 2.

In this embodiment, plural (four in this embodiment) magnetic bodies 17 are provided at intervals along the right edge of the front surface portion 15a and the front edge of the right surface portion 15d of the disposing portion in the airbag device housing room 15. Since these magnetic bodies 17 are secured to each magnet 32 of the front surface 30a and the side surface 30d of the projection 30, respectively, the portion of the peripheral edge portion of the opening 16 between adjoining magnetic bodies 17 is made to be in close contact with the inner surface of the mold by the tension F applied by each projecting portion 33. Therefore, it is possible to make the peripheral edge portion of the opening 16 be in close contact with the outer surface of the projection 30 along the entire periphery. In this embodiment, since the distance between adjoining magnetic bodies 17 and the distance between adjoining magnets 32 are respectively large, which is preferably about 30 to 200 mm and especially preferably about 50 to 150 mm, the number of magnetic bodies 17 and the magnets 32 provided on the outer surface of the peripheral edge portion of the opening 16 and the projection 30, respectively, may be relatively small. Even if such relatively large distance exists between adjoining magnetic bodies and between adjoining magnets 32, the portion of the peripheral edge portion of the opening 16 between adjoining magnetic bodies 17 may be sufficiently tensed and is made to be in close contact with the outer surface of the projection 30.

In this embodiment, as illustrated in FIGS. 9 and 10, since the seat pad main body 2 is foam-molded in the mold 20 with the front surface side thereof facing downward, in the state in which the reinforcing member 10 is attached to the core 23 and the upper mold 21 and the lower mold 22 are clamped together, the opening 16 of the disposing portion in the storage for the airbag device 15 of this reinforcing member 10 opens downward inside the mold 20. Therefore, if peripheral edge portion of the opening 16 is not in sufficiently close contact with the outer surface of the projection 30 when the foam synthetic resin raw material is poured into the lower mold 22 and is made to foam in the foam-molding process, a possibility that the foam synthetic resin which has expanded upward from the inside of lower mold 22 enters between the disposing portion in the airbag device housing room 15 and the outer surface of the projection 30 through the opening 16 becomes significantly high. However, according to the present invention, it is possible that not only the portion of the peripheral edge portion of the opening 16 secured to the outer surface of the projection 30 by the magnetic body 17 and the magnet 32 but the portion between adjoining magnetic bodies 17 which is not secured to the outer surface of the projection 30 may be made to be tensed by the tension F from each projecting portion 33 and is made to be in close contact with the outer surface of the projection 30, the peripheral edge portion of the opening 16 is made to be in close contact with an outer peripheral surface of the projection 30 along the entire periphery. Thereby, even if the opening 16 opens downward inside the mold 20, entry of the foam synthetic resin between the disposing portion in the airbag device housing room 15 and the outer surface of the projection 30 through this opening 16 may be sufficiently prevented.

As described above, according to the present invention, the portion of the peripheral edge portion of the opening 16 between adjoining magnetic bodies 17 may also be made to be tensed by the tension F from each projecting portion 33 and is made to be in close contact with the outer surface of the projection 30. Therefore, even if the opening 16 is elongated in the up-down direction, it is possible to prevent the peripheral edge portion of the opening 16 from rising from the projection 30 without the need of connecting, in a bridging manner, peripheral edge portions of the opening which face each other at a middle position in the up-down direction of the opening 16 (in this embodiment, the front edge of the right surface portion 15d and the right edge of the front surface portion 15a of the disposing portion in the storage for the airbag device 15) as described in Japanese Patent Publication. 2006-6349. In the above-described Japanese Patent Publication. 2006-6349, rising of the peripheral edge portions of the opening from the inner surface of the mold when the reinforcing member is mounted on the mold is prevented by connecting, in a bridging manner, the peripheral edge portions which the opening faces at the middle position in the up-down direction of the opening elongated in the up-down direction. In the gazette of the above-described Japanese Patent Publication. 2006-6349, a cut line is provided at each of both ends of this bridging type connecting portion and the bridging type connecting portion is configured to rupture at the cut lines when the airbag is inflated. Therefore, in the gazette, when the airbag is inflated, since the airbag needs to rupture the bridging type connecting portion and to make a pad on a front surface side of the airbag device housing room rupture and inflate further forward than the seat pad. Therefore, it is necessary to increase the initial inflating pressure of the airbag and therefore a gas generator for inflating the airbag of relatively high output is required. However, according to the present invention, since it is not necessary to provide such a bridging type connecting portion at the opening 16, a gas generator of relatively low output may be used. Therefore, the airbag device may be low in cost and small in weight. It is also possible to reduce variation in rupturing strength of the reinforcing member 10 caused by degrees of impregnation of the foam synthetic resin to the reinforcing member 10.

In this embodiment, the magnetic body 17 is provided in the reinforcing member 10 as a securing means for securing the reinforcing member 10 to the core 23 and, at the same time, the magnet 32 which attracts and holds the magnetic body 17 is provided in the core 23. Therefore, the structure of the securing means is simple and the operation to secure the reinforcing member 10 to the core 23 may be performed easily.

In this embodiment, as a tension application means for applying the tension F to the peripheral edge portion of the opening 16 of the disposing portion in the airbag device housing room 15, the projecting portion 33 which projects from the side surfaces 30*d* and 30*c* such that the portion of the side surface portions 15*d* and 15*c* of the disposing portion in the airbag device housing room 15 on the backside of each magnetic body 17 is separated from the side surfaces 30*d* and 30*c* of the projection 30 is provided. The tension application means constituted by this projecting portion 33 is simple in structure.

The projection height T of each projecting portion 33 is preferably 3 to 15 mm and especially preferably 3 to 10 mm preferably especially. Therefore, the portion of the side surface portions 15*d* and 15*c* of the disposing portion in the airbag device housing room 15 on the backside of each magnetic body 17 may be separated sufficiently from the side surfaces 30*d* and 30*c* of the projection 30 and the peripheral edge portion of the opening 16 may be sufficiently tensed. It is also possible to sufficiently prevent the side surface portions 15*d* and 15*c* from being excessively separated from the side surfaces 30*d* and 30*c* of the projection 30 such that each magnetic body 17 is not capable of being attracted by each magnet 32, and sufficiently control separation of the portion of the peripheral edge portion of the opening 16 between adjoining magnetic bodies 17 from the outer surface of the projection 30.

The distance $D_1$ between each projecting portion 33 and each magnetic body 17 and the distance $D_1$ between each projecting portion 33 and the magnet 32 are preferably 0 to 50 mm and especially preferably 0 to 30 mm. Since each magnetic body 17 and the magnet 32 do not interfere with each projecting portion 33, each magnetic body 17 may be attracted and held by each magnet 32 easily and sufficiently. Since each projecting portion 33 does not press the portion of the disposing portion in the airbag device housing room 15 separated excessively from each magnetic body 17 in the direction to separate from the outer surface of the projection 30, the peripheral edge portion of the opening 16 may be sufficiently tensed.

In this embodiment, since each projecting portion 33 is disposed further toward the opening 16 than the limit position P of the range of permission of entry of foam synthetic resin $D_2$ from the opening 16 and, at the same time, the distance $D_3$ from the limit position P is preferably 5 to 30 mm and especially preferably 10 to 20 mm, entry of the foam synthetic resin deeper than the limit position P of this range of permission of entry of foam synthetic resin $D_2$ through the opening 16 may be sufficiently prevented in the foam-molding process.

In this embodiment, the width W of each projecting portion 33 in a direction to approach and separate from the magnet 32 reduces toward each tip. Thus, if each of the side surface portions 15*d* and 15*c* of the disposing portion in the airbag device housing room 15 is placed over each projecting portion 33, contact areas between each projecting portion 33 and each of the side surface portions 15*d* and 15*c* is small. Therefore, greater tension F is applied to the peripheral edge portion of the opening 16, and the peripheral edge portion of the opening 16 is strongly tensed by this tension F.

[Other Arrangement Example of Reinforcing Member Fixing Means and Tension Application Means]

Figure 11:
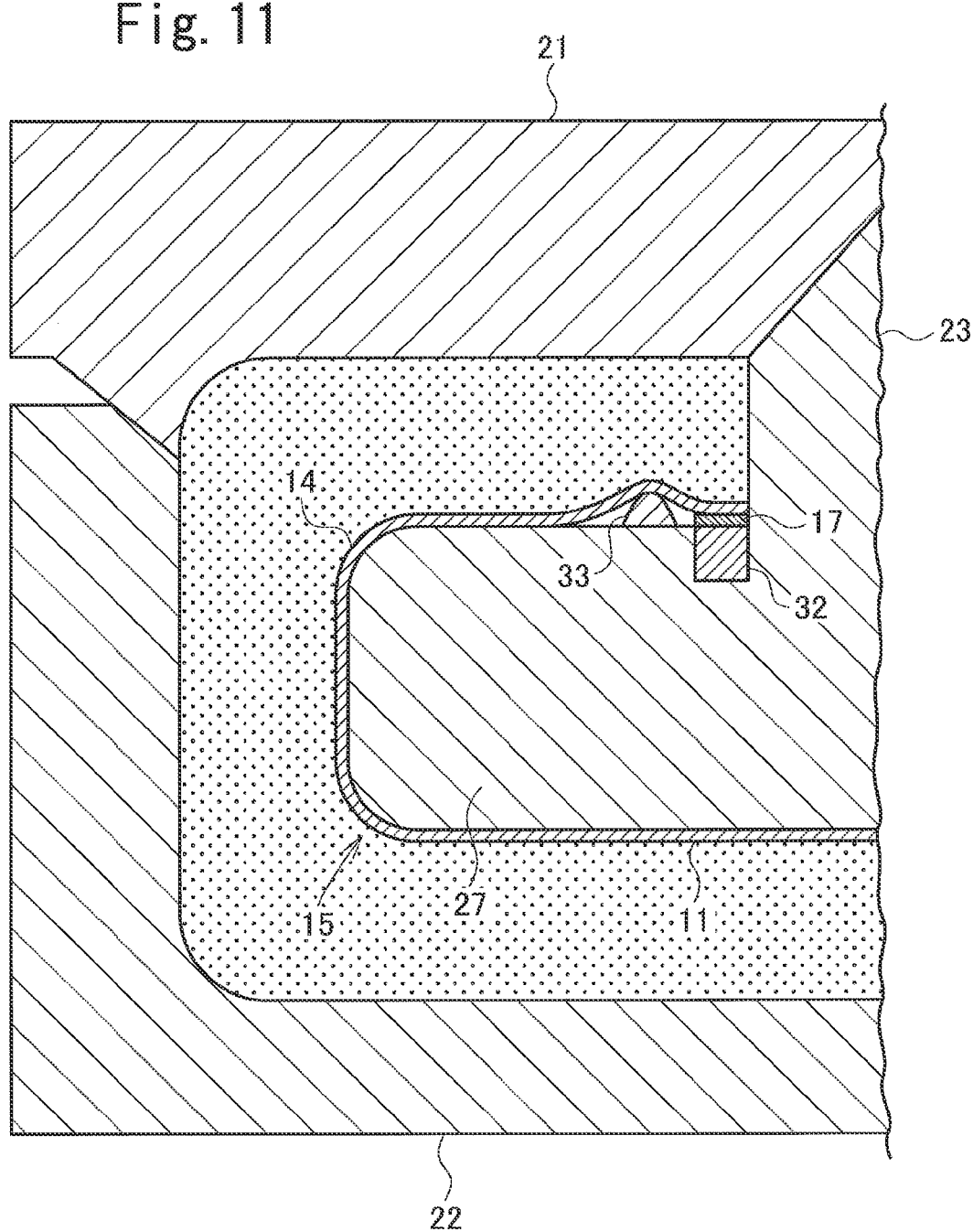
FIG. 11 is a cross-sectional view of a main portion of the mold illustrating another arrangement example of a projecting portion as a tension application means.

FIG. 11 is a cross-sectional view of a main portion of the mold 20 illustrating another arrangement example of a projecting portion 33 as a tension application means.

In the above-described embodiment, the projecting portion 33 as the tension application means is provided, on the inner surface of the mold 20, on the outer surface of the projection 30 to which the disposing portion in the airbag device housing room 15 of the reinforcing member 10 is attached and the projecting portion 33 is configured to make the peripheral edge portion of the opening 16 of this disposing portion in the airbag device housing room 15 be tensed: however, the arrangement of the projecting portion 33 is not limited to the this. For example, the projecting portion 33 as this tension application means may be provided also on the rear side of the magnet 32 for securing other end edges of the reinforcing member 10, such as the outer peripheral edge of the reinforcing member 10 and the peripheral edge portion of the opening other than the opening 16. As an example thereof, an example in which the projecting portion 33 as this tension application means is provided in the upper projecting portion 27 of the core 23 to which the upper piece portion 14 of the reinforcing member 10 is attached is illustrated in FIG. 11.

As illustrated in FIG. 11, the upper piece portion 14 of the reinforcing member 10 is placed over the upper surface and the rear surface of the projecting portion 27 from the front surface side of the upper projecting portion 27 of the core 23. The magnet 32 is embedded on the rear surface of the projecting portion 27, and the magnetic body 17 which is attracted by this magnet 32 is attached to the back side of an end edge opposite to the main piece portion 11 of the upper piece portion 14 (hereinafter, simply referred to as an "end edge"). Although illustration is omitted, plural magnetic bodies 17 are provided at intervals in the left-right direction at the end edge of the upper piece portion 14, and as many magnets 32 as the magnetic bodies 17 are provided on the rear surface of the projecting portion 27 in a positional relationship that the magnets 32 are placed over the each of the magnetic bodies 17 when the projecting portion 27 is attached to the upper piece portion 14. In the same manner as in the above-described embodiment, the number and arrangement of the magnetic bodies 17 and the magnets 32 are not limited to these.

In this embodiment, on the rear surface of the projecting portion 27, the projecting portion 33 projecting from the rear surface of the projecting portion 27 is provided at a position further toward the projecting portion 27 than each magnet 32 (hereinafter, referred to as a "rear side of each magnet 32"). Details (including modification), such as shape and size about this projecting portion 33, and a positional relationship with each magnet 32, are the same as those of the above-described embodiment.

Other structures of this embodiment are the same as those of the above-described embodiment, and the same reference numerals as those in FIGS. 1 to 10 denote the same portions in FIG. 11.

Also in this embodiment, in the state in which the upper piece portion 14 of the reinforcing member 10 is attached to the projecting portion 27 of the mold 20, and each magnetic body 17, which is provided at the end edge, is secured to each magnet 32 on the rear surface of the projecting portion 27, the portion of the upper piece portion 14 disposed further rearward than each magnetic body 17 is pressed in the direction to separate from the rear surface of the projecting portion 27 by the projecting portion 33 and, thereby, the tension F is applied to the end edge of the upper piece portion 14 so as to be drawn in the projecting portion 33. With this tension F, the end edge of the upper piece portion 14 is tensed between adjoining magnetic bodies 17 and is made to be in close contact with the rear surface of the projecting portion 27. Therefore, the end edge of the upper piece portion 14 may be made to be in sufficiently close contact with the rear surface of the projecting portion 27 without the need of providing many magnetic bodies 17 and the magnets 32 arranged at narrower intervals on the end edge of the upper piece portion 14 and on the rear surface of the projecting portion 27. Therefore, the number of magnetic bodies 17 and the magnets 32 to be provided at the end edge of the upper piece portion 14 and on the rear surface of the projecting portion 27 may be reduced, and the operation to secure the reinforcing member 10 to the projecting portion 27 of the end edge of the upper piece portion 14. In this manner, it is possible that not only the portion of the edge portion of the upper piece portion 14 secured to the outer surface of the projection 30 by the magnetic body 17 and the magnet 32 but the portion which is not secured by the magnetic body 17 and the magnet 32 is made to be in close contact with the rear surface of the projecting portion 27. Therefore, it is possible in the foam-molding process to sufficiently prevent rising of the end edge of the upper piece portion 14 from the rear surface of the projecting portion 27, entering of the foam synthetic resin between the upper piece portion 14 and the rear surface of the projecting portion 27, and wrinkling of the upper piece portion 14. Therefore, it is possible to manufacture the seat pad 1 having the reinforcing member 10 integrated precisely on the surface of the seat pad main body 2.

Other operation and effect of this embodiment are the same as that of the above-described embodiment except that the projecting portion 33 is disposed on the rear surface of the projecting portion 27 and that the tension F is applied to the end edge of the upper piece portion 14 by this projecting portion 33.

Although FIG. 11 illustrates a structure in which the projecting portion 33 is provided at the upper projecting portion 27 of the core 23, the projecting portion 33 as the tension application means may also be provided, for example, at a lower end portion of the core 23 to which the lower end side of the main piece portion 11 of the reinforcing member 10 is secured, and on the rear surface of the left and right projections 25 and 26 of the core 23 to which the left and right edges of the side piece portions 12 and 13 are secured in the same manner as in this embodiment.

[Second Embodiment]

Figure 12A:
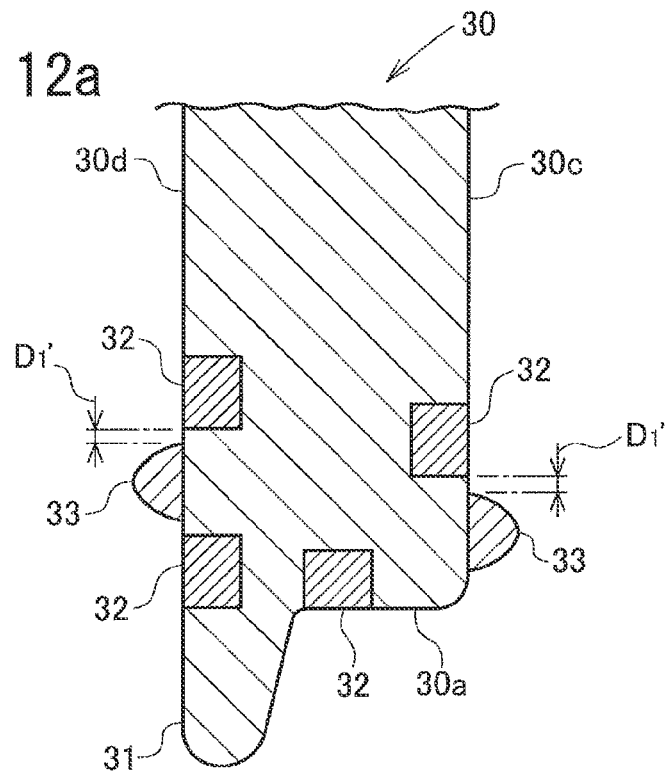
FIG. 12a and FIG. 12b are each a cross-sectional view of the same portion of the mold for foam molding as illustrated in FIG. 8a and FIG. 8b according to a second embodiment.
Figure 12B:
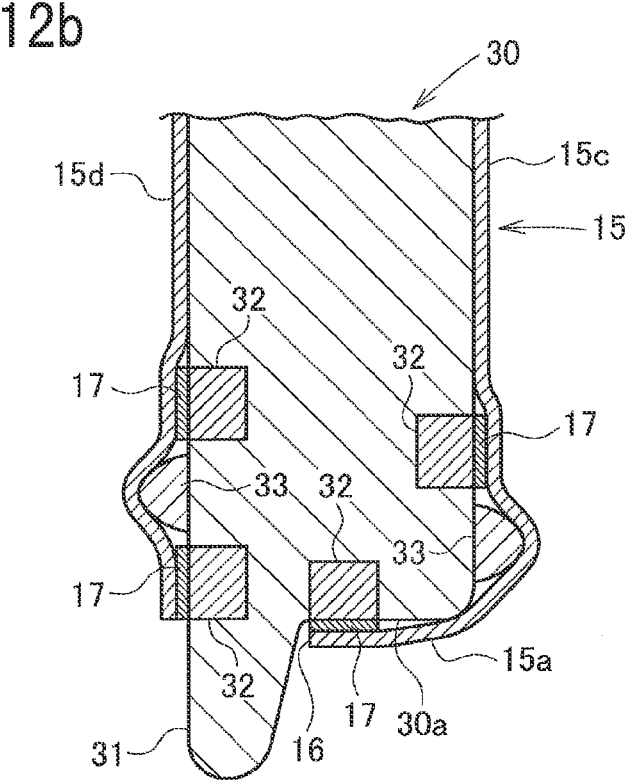

FIG. 12a and FIG. 12b are each a cross-sectional view of the same portion of the mold for foam molding (i.e., near the front end of the projection for forming an airbag device housing space 30) as those illustrated in FIG. 8a and FIG. 8b according to a second embodiment. FIG. 12a illustrates a state before the reinforcing member 10 is attached to the projection 30 and FIG. 12b illustrates a state after the reinforcing member 10 is attached.

In this embodiment, independently from the magnets 32 disposed further forward than each projecting portion 33 provided on the front surface 30a and the side surface 30d of the projection 30 (hereinafter, referred to as a "front-side magnet 32") as illustrated in FIG. 12a, the magnet 32 is also provided at a position further rearward than each projecting portion 33 (hereinafter, referred to as a "rear-side magnet 32"). The structure and arrangement of the front-side magnet 32 are the same as that of magnet 32 in embodiment of above-described FIGS. 1 to 10. Although illustration is omitted, as many rear-side magnets 32 as that of the front-side magnets 32 are provided and each of the rear-side magnets 32 is disposed on the opposite side of each of the front-side magnets 32 via the projecting portion 33. The number and arrangement of the front-side magnets 32 and the rear-side magnets 32 are not limited to these. For example, it is not necessary that the front-side magnets 32 are disposed on the opposite side of the rear-side magnets 32 via the projecting portion 33. The front-side magnets 32 and the rear-side magnets 32 may be different in number. The distance $D_1'$ between the projecting portion 33 and the rear-side magnet 32 (FIG. 12a) is, the same as the distance $D_1$ between the front-side magnet 32 and the projecting portion 33, preferably 0 to 50 mm and especially preferably 0 to 30 mm. Details (including modification), such as shape, size and arrangement, about this rear-side magnet 32 other than those described above are the same as those of the front-side magnet 32.

As illustrated in FIG. 12b, front-side magnetic bodies 17 which are attracted by the front-side magnets 32 of this projection 30 and rear-side magnetic bodies 17 which are attracted by the rear-side magnet 32 of the projection 30 are provided in the disposing portion in the airbag device housing room 15 of the reinforcing member 10. The front-side magnetic bodies 17 are disposed on the back side of the peripheral edge portion of the opening 16. The structure and arrangement of this front-side magnetic body 17 are the same as those of the magnetic body 17 in the embodiment of above-described FIGS. 1 to 10. Each of the rear-side magnetic bodies is disposed further rearward than the front-side magnetic bodies 17 on the back side of the side surface portions 15d and 15c of the disposing portion in the storage for the airbag device 15. In this embodiment, as many rear-side magnetic bodies 17 as the front-side magnetic bodies 17 are provided. In the state in which the disposing portion in the airbag device housing room 15 is attached to the projection 30, each of the rear-side magnetic bodies 17 is situated at a position opposite to the front-side magnetic bodies 17 via the projecting portion 33. The front-side magnetic bodies 17 and the rear-side magnetic bodies 17 may be different in number. It is not necessary that the front-side magnetic bodies 17 and the rear-side magnetic body 17 face one another via the projecting portion 33. Details (including modification), such as shape, size and arrangement, about the rear-side magnetic bodies 17 other than those described above are the same as those of the front-side magnetic body 17.

Other structures of this embodiment are the same as those of the above-described embodiment of FIGS. 1 to 10. The same and the same reference numerals as those of FIGS. 1 to 10 denote the same portions in FIGS. 12a and 12b.

In this embodiment, after attaching the disposing portion in the airbag device housing room 15 to the projection 30 in the reinforcing member disposing process, each front-side magnetic body 17 of the peripheral edge portion of the opening 16 of the disposing portion in the airbag device housing room 15 is secured to each front-side magnet 32 of the front surface 30a and the side surface 30d of the projection 30 and, at the same time, each rear-side magnetic body 17 of the side surface portions 15d and 15c is secured to each rear-side magnet 32 of the side surfaces 30d and 30c of the projection 30. Since the side surface portions 15d and 15c are secured to the side surfaces 30d and 30c of the projection 30 by the rear-side magnetic body 17 and the rear-side magnet 32 on the rear side of each projecting portion 33, the side surface portions 15d and 15c are pressed against each of the projecting portions 33 and greater tension F is applied to the peripheral edge portion of the opening 16 from each projecting portion 33, whereby the peripheral edge portion of the opening 16 may be more strongly tensed by this tension F.

Other operation and effect of this embodiment are the same as those of the above-described embodiment.

[Other Exemplary Shapes of Projecting Portion as Tension Apply Means]

Although the projecting portion 33 has a substantially semicylindrical cross section with outwardly curved outer surface of the tip thereof in each of the above-described embodiments, the cross sectional shape of the projecting portion is not limited to this. Other exemplary shapes of the projecting portion are illustrated in FIGS. 13a and 13b.

Figure 13A:
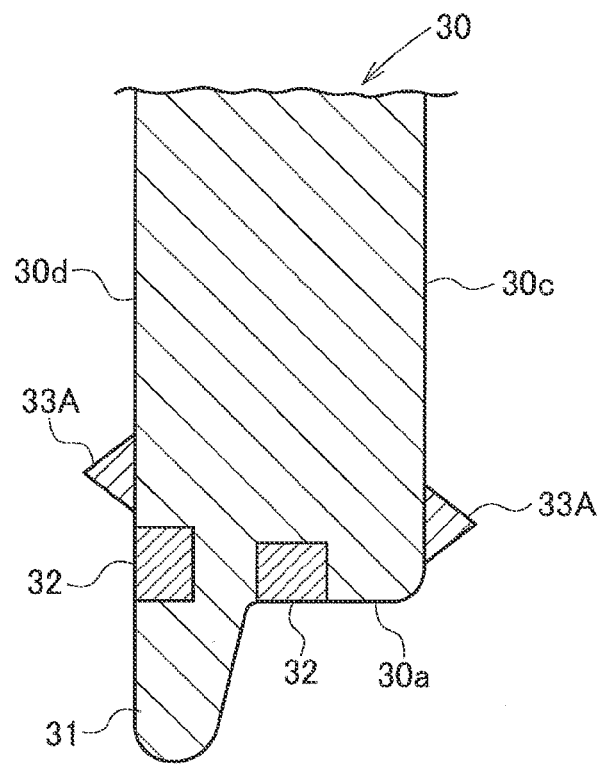
FIG. 13a and FIG. 13b are each a cross-sectional view of the same portion as illustrated in FIG. 8a illustrating another example of the shape of the projecting portion as the tension application means.

A projecting portion 33A in FIG. 13a has a substantially triangular prism cross section with a pointed top. Regarding this the projecting portion 33A, when the projecting portion 33A is placed over the side surface portions 15d and 15c (illustration thereof is omitted in FIGS. 13a and 13b) of the disposing portion in the airbag device housing room 15, contact areas between the projecting portion 33A and each of the side surface portions 15d and 15c are significantly small and greater stress is applied to this contact portion: therefore, greater tension F is applied to the peripheral edge portion of the opening 16 and the peripheral edge portion of the opening 16 is more tensed by this tension F.

Figure 13B:
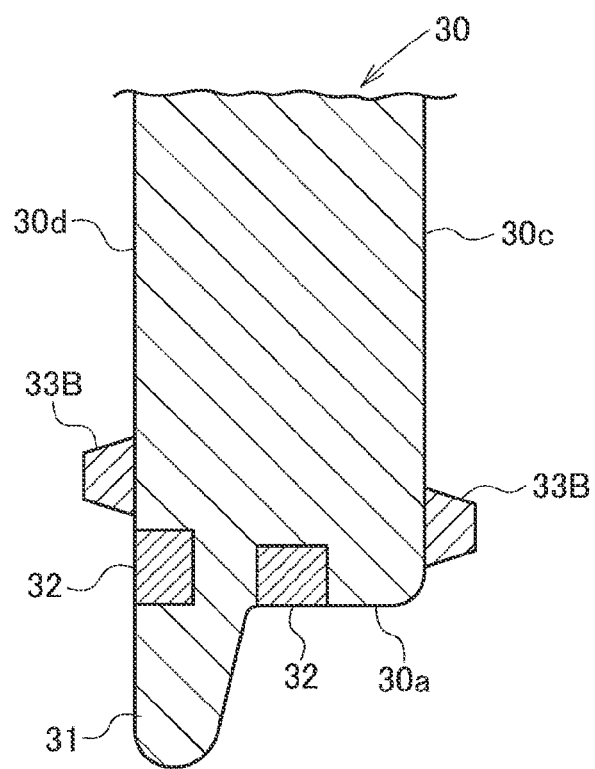

In the present invention, the tip of the projecting portion is not necessarily has outwardly curved or pointed: for example, the tip may be flat as a projecting portion 33B of FIG. 13b. In FIG. 13b, the projecting portion 33B has a flat surface at the tip thereof and is formed in a substantially trapezoidal quadrangular prism shape with the width being reduced along the direction to approach and separate from the magnet 32. However, the cross sectional shape of the projecting portion is not limited to this and, for example, may be a polygonal shape more than pentagon.

The projecting portions 33 are disposed successively from the upper end to the lower end of the side surfaces 30d and 30c of the projection 30 in each of the above-described embodiments. However, for example, the projecting portions 33 may be disposed intermittently on the rear side of each of the magnets 32 in the same manner as the projecting portions 33C in FIG. 14.

Figure 14:
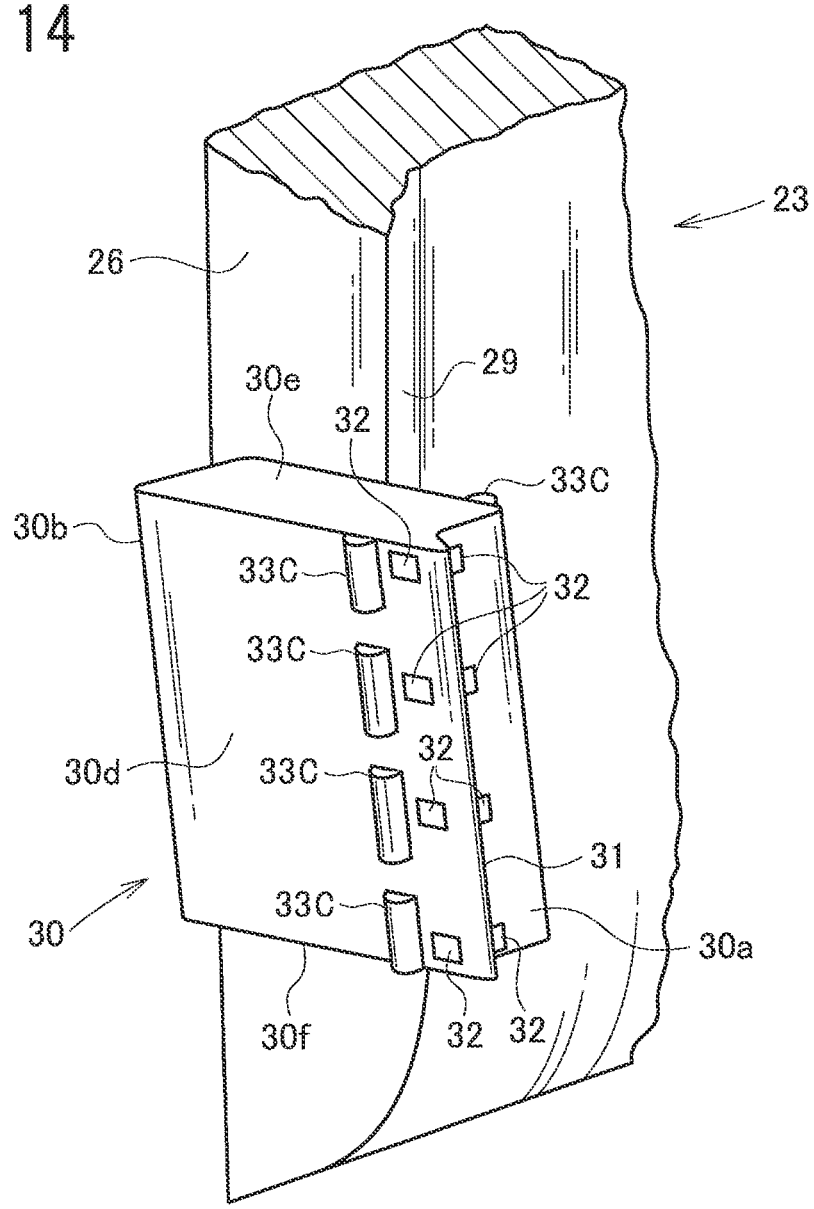
FIG. 14 is a perspective view of the same portion as illustrated in FIG. 6 illustrating another example of the shape of the projecting portion as the tension application means.

Although each of the projecting portions 33C is disposed so as to face the rear side of each of the magnet 32 in FIG. 14, it is not necessary that each of the projecting portions 33C faces the magnet 32. Thus, if the projecting portions 33C are disposed intermittently as in this case, the distance between adjoining projecting portions 33C is preferably 1 to 70 mm and especially preferably 1 to 30 mm.

Each of above-described projecting portions 33, 33A to 33C is an example and the structure of the projecting portion as a tension application means of the present invention is not limited to the illustrated structure.

[Other Structure of Reinforcing Member Fixing Means]

As a securing means for securing the reinforcing member 10 to the inner surface of the mold 20, the magnet 32 and the magnetic body 17 which may be attracted to the magnet 32 are provided on the inner surface of the mold 20 and the reinforcing member 10, respectively. However, the structure of the securing means of the reinforcing member is not limited to this. For example, although illustration thereof is omitted, the reinforcing member 10 may be secured to the inner surface of the mold 20 using a clip which may be made to engage the inner surface of the mold 20, an adhesive material, static electricity of the mold, suction force of the mold, a hook-and-Loop fastener, and the like. This adhesive material may be provided on the reinforcing member side.

The following structure may also be employed: a pin and the like projecting inward into the mold 20 may be provided on the inner surface of the mold 20 as a securing means and the reinforcing member 10 is made to engage this pin, whereby the reinforcing member 10 is secured to the inner surface of the mold 20.

These embodiments described above are examples of the present invention, and the present invention may also be implemented in other forms than those described above.

The present invention is applicable also to a mold for foam molding adapted for foam-molding a foam-molded member other than the seat pad and a method for producing the foam-molded member.

Although the present invention has been described in detail using particular embodiments, it is obvious to the person skilled in the art that various modifications may be made without departing from the spirit and scope of the present invention.

The present application is based on Japanese Patent Application filed on Jan. 28, 2010 (Japanese Patent Application No. 2010-017031), which is incorporated in this description in its entity.

The invention claimed is:

1. A mold for foam molding adopted for foam-molding a foam-molded member which is provided with a foam-molded body and a sheet-shaped reinforcing member disposed along at least a part of a surface of the foam-molded body,
    wherein the reinforcing member comprises an opening that is a through hole at a surface of the reinforcing member;
    the mold comprises a projecting portion, securing members disposed around the projecting portion, and a tension application member; and
    at least one of the securing members is disposed closer to the projecting portion than the tension application member is; and wherein
    in a state in which the reinforcing member is secured to an inner surface of the mold,
    the projecting portion is inserted through the opening of the reinforcing member;
    a peripheral edge portion of the opening is at least partially secured to the inner surface of the mold by the securing members; and
    tension is applied to the peripheral edge portion by the tension application member in a direction so as to urge separation from the securing members and the opening, thereby tensioning the peripheral edge portion of the opening.

2. The mold for foam molding according to claim 1, further the securing members are provided at intervals along a direction in which an end edge of the reinforcing member extends.

3. The mold for foam molding according to claim 1, wherein the reinforcing member is disposed with at least a part of an end edge thereof facing downward on the inner surface of the mold.

4. The mold for foam molding according to claim 1, wherein the securing members comprises a magnet provided in one of the reinforcing member and the inner surface of the mold, and a magnetic body provided in the other, the magnetic body being capable of being attracted and held by the magnet.

5. The mold for foam molding according to claim 1, wherein the tension application member comprises a projection which projects from the inner surface of the mold so that a portion of the reinforcing member further distanced from an end edge of the reinforcing member than the at least one of the securing members is separated from the inner surface of the mold.

6. The mold for foam molding according to claim 5, wherein a projection height T of the projection from the inner surface of the mold is 3 to 15 mm.

7. The mold for foam molding according to claim 5, wherein a distance $D_1$ between the projection and the at least one of the securing members is 50 mm or less.

8. The mold for foam molding according to claim 5, wherein a tip portion of the projection is shaped such that a width W thereof along a direction close to and away from the at least one of the securing members is reduced toward a tip of the projection.

9. The mold for foam molding according to claim 5, further the securing members configured to secure at least a part of the reinforcing member to the inner surface of the mold, wherein said part is further distanced from the end edge of the reinforcing member than the projection.

* * * * *